US011561930B2

(12) United States Patent
Muniswamy Reddy et al.

(10) Patent No.: US 11,561,930 B2
(45) Date of Patent: *Jan. 24, 2023

(54) INDEPENDENT EVICTIONS FROM DATASTORE ACCELERATOR FLEET NODES

(71) Applicant: Amazon Technologies, Inc., Seattle, WA (US)

(72) Inventors: Kiran Kumar Muniswamy Reddy, Sammamish, WA (US); Anand Sasidharan, Seattle, WA (US); Omer Ahmed Zaki, Bellevue, WA (US); Brian O'Neill, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 249 days.

This patent is subject to a terminal disclaimer.

(21) Appl. No.: 16/684,943

(22) Filed: Nov. 15, 2019

(65) Prior Publication Data

US 2020/0081867 A1 Mar. 12, 2020

Related U.S. Application Data

(63) Continuation of application No. 15/085,967, filed on Mar. 30, 2016, now Pat. No. 10,482,062.

(51) Int. Cl.
*G06F 16/16* (2019.01)
*G06F 12/0831* (2016.01)
(Continued)

(52) U.S. Cl.
CPC ........ *G06F 16/162* (2019.01); *G06F 12/0833* (2013.01); *G06F 12/128* (2013.01); *G06F 12/12* (2013.01); *G06F 2212/621* (2013.01)

(58) Field of Classification Search
CPC ...... G06F 16/162; G06F 12/12; G06F 12/128; G06F 12/0833; G06F 2212/621
See application file for complete search history.

(56) References Cited

U.S. PATENT DOCUMENTS 6,487,641 B1 11/2002 Cusson et al.
7,505,979 B2 3/2009 Tamatsu
(Continued)

FOREIGN PATENT DOCUMENTS

CN 2004036432 4/2004
CN 104346433 2/2015

OTHER PUBLICATIONS

"Amazon ElastiCache API Reference", Amazon Web Services, API Version, Feb. 2, 2015, pp. 1-169.
(Continued)

*Primary Examiner* — Robert W Beausoliel, Jr.
*Assistant Examiner* — Susan F Rayyan
(74) *Attorney, Agent, or Firm* — Robert C. Kowert; Kowert, Hood, Munyon, Rankin & Goetzel, P.C.

(57) ABSTRACT

A fleet of query accelerator nodes is established for a data store. Each accelerator node caches data items of the data store locally. In response to determining that an eviction criterion has been met, one accelerator node removes a particular data item from its local cache without notifying any other accelerator node. After the particular data item has been removed, a second accelerator node receives a read query for the particular data item and provides a response using a locally-cached replica of the data item.

20 Claims, 12 Drawing Sheets

(51) Int. Cl.
*G06F 12/128* (2016.01)
*G06F 12/12* (2016.01)

(56) References Cited

U.S. PATENT DOCUMENTS

| | | | |
|---|---|---|---|
| 7,555,527 B1* | 6/2009 | Slaughter | H04L 45/02 |
| | | | 345/536 |
| 7,925,623 B2* | 4/2011 | Therrien | G06F 11/2094 |
| | | | 707/610 |
| 8,060,619 B1* | 11/2011 | Saulpaugh | G06F 16/27 |
| | | | 709/227 |
| 8,763,091 B1 | 6/2014 | Singh et al. | |
| 8,930,522 B2* | 1/2015 | Cortes | H04L 12/66 |
| | | | 709/224 |
| 8,972,343 B2* | 3/2015 | Hironaga | G06F 3/065 |
| | | | 707/610 |
| 9,182,912 B2* | 11/2015 | Bert | G06F 12/0897 |
| 9,201,891 B2* | 12/2015 | Romanski | G06F 12/0253 |
| 9,311,240 B2* | 4/2016 | Dawkins | H04L 67/288 |
| 9,678,968 B1 | 6/2017 | Taylor et al. | |
| 10,102,150 B1* | 10/2018 | Visvanathan | G06F 12/0868 |
| 10,430,102 B2* | 10/2019 | Kaczmarczyk | G06F 3/0641 |
| 10,474,587 B1* | 11/2019 | Visvanathan | G06F 12/0808 |
| 10,482,062 B1 | 11/2019 | Muniswamy Reddy et al. | |
| 10,482,065 B1* | 11/2019 | Armangau | G06F 16/1748 |
| 10,482,101 B1* | 11/2019 | van Rotterdam | G06F 16/219 |
| 10,509,769 B1* | 12/2019 | Shilane | G06F 16/24 |
| 2003/0158842 A1 | 8/2003 | Levy et al. | |
| 2012/0047126 A1 | 2/2012 | Branscome et al. | |
| 2013/0024484 A1* | 1/2013 | Banerjee | G06F 16/28 |
| | | | 707/822 |
| 2013/0036265 A1 | 2/2013 | Bert et al. | |
| 2013/0325804 A1* | 12/2013 | Bachar | G06F 16/164 |
| | | | 707/634 |
| 2014/0122489 A1 | 5/2014 | Mesnier et al. | |
| 2014/0156777 A1* | 6/2014 | Subbiah | H04L 67/1097 |
| | | | 709/213 |
| 2014/0330921 A1 | 11/2014 | Storm et al. | |
| 2015/0046428 A1* | 2/2015 | Asaad | G06F 16/24544 |
| | | | 707/718 |
| 2016/0065492 A1 | 3/2016 | Hu et al. | |
| 2017/0249310 A1* | 8/2017 | Kumar | G06F 12/0813 |
| 2020/0192576 A1* | 6/2020 | Nair | G06F 12/1018 |

OTHER PUBLICATIONS

"Amazon DynamoDB Developer Guide", Amazon Web Services, API Version, Aug. 10, 2012, pp. 1-715.
"Amazon ElastiCache User Guide", Amazon Web Services, API Version, Feb. 2, 2015, pp. 1-303.
"My SQL::MySQL 5.7 Reference Manual:16.3.3.2 Using memcached as a MySQL Caching Layer", Retrieved from URL: https://dev.mysql.com/doc/refman/5.7/en/hamemcachedmysqlfrontend.html on Feb. 22, 2016, pp. 1-3.
"Overview—memcached/memcached Wiki—GitHub", Retrieved from URL: https://github.com/memcached/memcached/wiki/Overview on Feb. 22, 2016, pp. 1-4.
"Using Redis as an LRU cache—Redis", Retrieved from URL: http://redis.io/topics/lrucache on Feb. 22, 2016, pp. 1-6.
"What eviction policies do you support?", Retrieved from URL: https://support.redislabs.com/hc/enus/articles/203290657Whatevictionpoliciesdoyousupport1/ on Jan. 27, 2016, pp. 1-2.
"MongoDB Documentation Release 3.2.3", MongoDB, Inc., Feb. 17, 2016, pp. 1-1068.
C. Bormann, et al., "Concise Binary Object Representation (CBOR)", Internet Engineering Task Force (IETF), RFC7049, Oct. 2013, pp. 1-54.
The tupl Open Source Project on Open Hub", Retrieved from URL", https://www.openhub.net/p/tupl on Feb. 9, 2016, pp. 1-5.
U.S. Appl. No. 15/085,956, filed Mar. 30, 2016, Kiran Kumar Muniswamy Reddy, et al.
U.S. Appl. No. 15/085,957, filed Mar. 30, 2016, Kiran Kumar Muniswamy Reddy, et al.
U.S. Appl. No. 15/269,935, filed Sep. 19, 2016, Brian O'Neill et al.

* cited by examiner

Rule R1: Source = master, populate-requester-only

Rule R2: Source = master, populate-multiple-nodes

Rule R3: Source = peer, populate-requester-only

Rule R4: Source = backend, populate-requester-only

Rule R5: Source = backend, multi-node propagation via master

INDEPENDENT EVICTIONS FROM DATASTORE ACCELERATOR FLEET NODES

This application is a continuation of U.S. patent application Ser. No. 15/085,967, filed Mar. 30, 2016, which is hereby incorporated by reference herein in its entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine. Similarly, a single physical storage device may be used to store data items of several different customers, e.g., in respective virtualized storage containers.

Some service providers have built sophisticated multi-tenant database services (as well as other types of multi-tenant storage services) using virtualized storage nodes as building blocks. By distributing the data of a given customer across multiple storage nodes, storing the data of multiple customers on a given storage node, and distributing the storage nodes across multiple physical data centers, very high levels of data durability and availability may be supported at such multi-tenant services. While multi-tenancy (the sharing of physical resources among multiple customers) may help increase overall resource utilization levels from the perspective of a service provider, some storage application users may prefer to access at least a subset of their data in single-tenant mode. Furthermore, some of the durability and availability features of the multi-tenant storage services may not necessarily be required for all versions of the data sets of some storage applications, especially if tradeoffs are possible between those features and enhanced performance levels.

Figure 1:
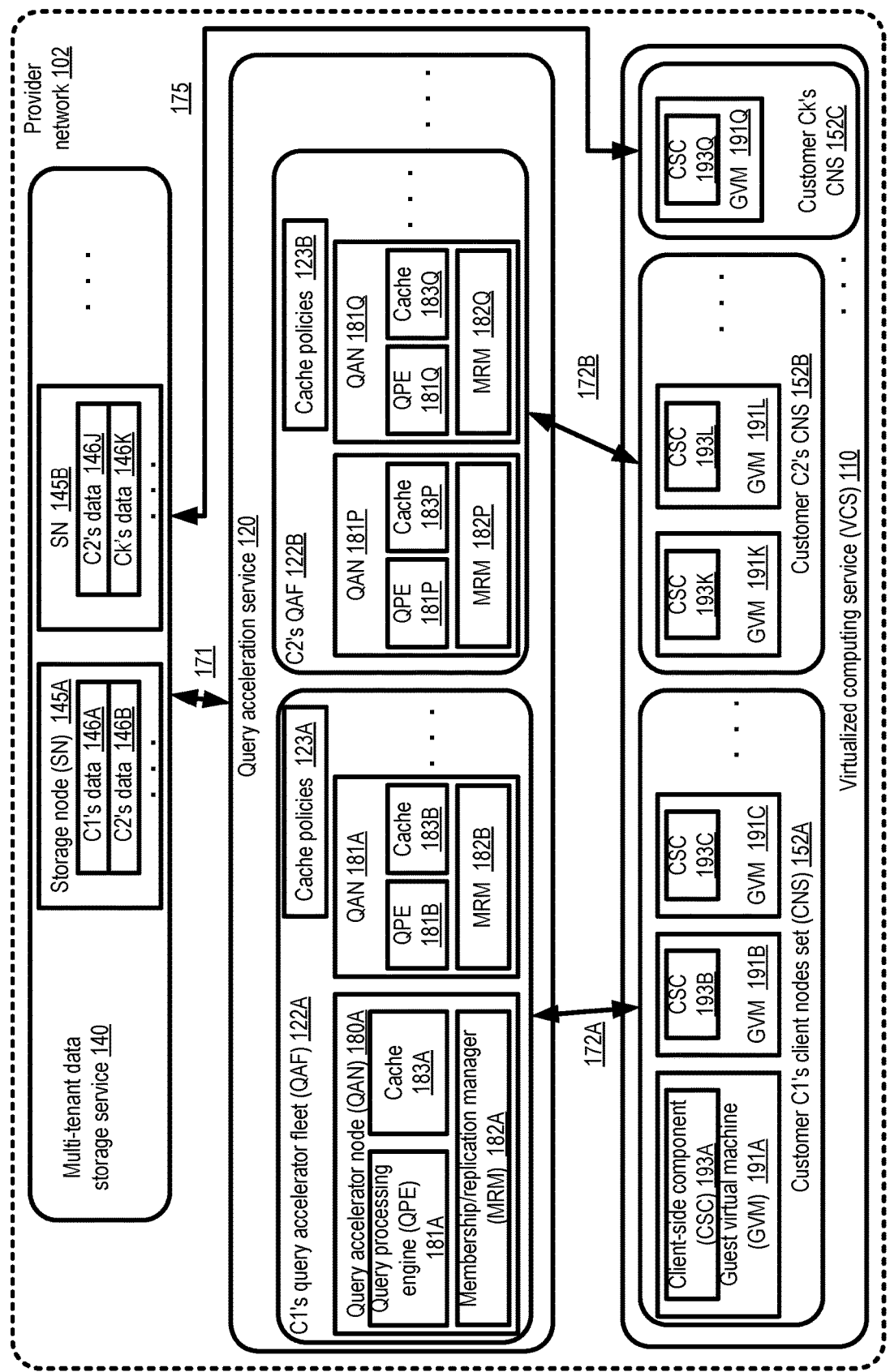
FIG. 1 illustrates an example system environment in which respective single-tenant fleets of query accelerator nodes may be established on behalf of respective clients of a multi-tenant data store, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for managing data object evictions, read misses and writes at query accelerator nodes associated with storage services at a provider network are described. Networks set up by an entity such as a company or a public sector organization to provide one or more network-accessible services (such as various types of cloud-based computing or storage services) accessible via the Internet and/or other networks to a distributed set of clients may be termed provider networks herein. A provider network may sometimes be referred to as a "public cloud" environment. The resources of a provider network may in some cases be distributed across multiple data centers, which in turn may be distributed among numerous cities, states and countries. In some provider networks, a multi-tenant virtualized computing service as well as one or more multi-tenant storage services may be supported. Using such services, customers may, for example, acquire a set of virtual machines from the virtual computing service, store various data sets at storage nodes of selected storage services, and use the virtual machines to run applications that access the data sets. A given resource (e.g., a storage device or a computing device) of a multi-tenant service may at least in principle be utilized in multi-tenant mode, i.e., for operations performed on behalf of multiple customer accounts.

A variety of storage services may be implemented at a single provider network in some cases. In one embodiment, for example, the storage services may include a non-relational ("NoSQL") database service, a relational database service, and/or an object storage service in which unstructured objects of arbitrary size may be stored and accessed using web-service interfaces. Each of the storage services may comprise respective pools of storage, computing and networking resources, which may in some cases be managed separately from the resources of the virtualized computing service. For example, in one implementation a separate logical partition of the provider network may be used for a given storage service than is used for the virtualized computing service, or the computing devices used for a given storage service may be physically segregated (e.g., in different data center rooms or racks) from the computing devices used for the virtualized computing service. A storage service may provide high levels of availability and data durability, e.g., by partitioning data sets across multiple multi-tenant storage nodes (each of which in turn may comprise various physical storage devices), replicating partitions across data centers, and so on. A given storage service may be used to create multiple instances of data stores set up for respective applications and/or respective customers—e.g., instances of relational databases, instances of non-relational databases, or groups of other storage objects may be created. The term "data store", as used herein, may refer to a collection of data items (e.g., database tables, indexes, binary objects, and the like) with an associated namespace (e.g., a database name or an object collection name) established on behalf of one or more customer accounts of one or more storage services. The terms "data item" and "data object" may be used synonymously herein.

According to one embodiment, a provider network may comprise a query acceleration service which may be used as an intermediary between a storage service (or several storage services) and computing devices at which components of applications that utilize data sets stored at the storage service(s) are run. Using such an intermediary query acceleration service, for example, a single-tenant fleet of query accelerator nodes may be established on behalf of a given customer of a storage service to help speed up I/O operations of one or more storage applications of the customer. A query accelerator node may comprise a local cache (implemented, for example, using some combination of volatile and/or non-volatile memory) at which at least a subset of an application's data set may be stored at a given point in time, as well as a query processing engine configured to respond to I/O requests received from client-side components of storage applications. A client-side component may, for example, comprise one or more processes running at a virtual machine instantiated on behalf of a particular customer of the provider network, and may issue I/O requests (e.g., reads or writes) formatted according to application programming interfaces of a storage service of the provider network. A given fleet of query accelerator nodes may be termed "single-tenant" in that the nodes may be allocated for use by client-side components associated with a single customer account in various embodiments. For example, in response to a request to set up a fleet of query accelerator nodes for the customer account, the control plane (administrative component) of the query acceleration service may store metadata indicating that only those client-side components which are associated with the customer account may be permitted to access the query accelerator nodes of the fleet. An authorization management component of a query accelerator node may reject requests or communications which do not originate at such client-side components. In at least one embodiment, at least some query accelerator nodes may be configured in multi-tenant mode—e.g., a customer on whose behalf the node is initially established may request that client-side components associated with other customer accounts be permitted to use the node. In one embodiment, a storage service for which a query accelerator fleet is configured may support single-tenancy—e.g., at least some storage nodes and/or other components of the storage service may be designated for exclusive use by a single customer.

In some embodiments in which the storage service and the virtualized computing service are implemented in separate logical partitions of the provider network, at least some of the query accelerator nodes may be implemented within the logical partition of the provider network which is being used for the virtualized computing service. As a result, the query accelerator fleet may be located "nearer" to the client-side components, at least from a networking perspective—for example, on average fewer network links may have to be traversed for communications between client-side components and the query accelerator nodes than have to be traversed for communications between the client-side components and the storage nodes of the storage service. In some cases, a placement manager component of the query acceleration service may select the physical locations (e.g., racks, rooms, or data centers) at which query accelerator nodes are established on behalf of a customer based on proximity with respect to the virtual machines established for the customer—e.g., the query accelerator nodes may be physically located relatively near the hosts at which the customer's virtual machines run. In various embodiments, as suggested by the use of the term "accelerator", client requests which can be fulfilled by either the query accelerator fleet or the storage service may typically be fulfilled more rapidly by the query accelerator fleet than by the storage service. This performance difference may typically hold regardless of whether separate logical partitions of the provide network are used for the storage service than for the virtual computing devices, and regardless of the specific placement of various devices involved in I/O request handling. In some embodiments, at least some client-side components may run at devices outside the provider network (e.g., in a customer data center or customer office premises), and requests issued from such external components may also benefit from the enhanced performance enabled by a query accelerator fleet.

In various embodiments, for at least some data sets, the storage service may serve as the authoritative source of the data, while the query accelerator fleet nodes may be considered temporary containers of (in some cases potentially stale) versions of the data. The data stores containing the authoritative versions of the data may be termed back-end data stores, while the query accelerator nodes may be termed part of a middleware layer of the overall system used for storage applications. Several different types of policies may be enforced for managing the flow of data among client-side components, query accelerator nodes, and the back-end data stores in various embodiments, as described below in further detail. Such policies may govern, for example, the manner in which read and write requests from client-side components are distributed among different query accelerator nodes, how writes are handled, how read misses are handled, and/or how evictions of data items from the local caches of the query accelerator nodes are handled.

Each query accelerator node of a given fleet may be assigned one of two roles in some embodiments. One or more nodes may be designated as "master" nodes at a given point in time, while the remainder of the nodes may be designated as "non-master" nodes. Writes may be directed to master nodes from client-side components, while reads may be directed to either master or non-master nodes in such embodiments. According to one embodiment, a master node may be responsible for propagating replicas of data items to non-master nodes (e.g., either a subset of non-master nodes, or all non-master nodes). For example, if a master node obtains a data item (either as a result of a write request from a client-side component, or from a back-end data store as a result of a read request which resulted in a cache miss at the master), it may store the data item in its local cache and initiate replication of the data item at one or more non-master nodes. In one implementation, if there are N non-master nodes and one master node in a given fleet, the master may transmit N messages containing replicas of the data item (one message to each non-master node). In another implementation, the master may transmit M messages (where M is less than N), one each to M of the non-master nodes, and the non-master nodes may propagate the replicas to remaining nodes. In some embodiments, a data item may not necessarily be replicated to all the nodes of the fleet. Upon receiving a replica of a data item replica DI1, a given query accelerator node may store DI1 in its local cache, and respond to subsequent requests for DI1 (or for a collection of data items which include DI1) using the locally-cached replica. In some embodiments, instead of designating a subset of nodes as masters configured to handle writes as well as reads, all nodes of a fleet may handle writes as well as reads.

In various embodiments, regardless of whether master or non-master roles are assigned, the nodes of a given query accelerator fleet may differ from one another in various capabilities and characteristics. For example, the local caches of different nodes may differ in total size, or in the types of devices used for the local caches. Some nodes may use volatile memory (e.g., the "main" memory of a computing device) alone for their local caches. Other nodes may use a combination of volatile and non-volatile storage—e.g., main memory plus a solid state drive (SSD), main memory plus a magnetic rotating disk-based device, or main memory plus an SSD plus a rotating disk device. In one implementation, some nodes may utilize only non-volatile storage for their caches. In one embodiment, at least one query accelerator node may utilize a network-attached storage drive for a portion of its local cache, e.g., especially if the latency for accessing the network-attached storage is smaller than the latency for accessing the back-end data store.

A number of different criteria may be used to determine when or if a given data item is to be evicted from a given query accelerator node's local cache, or to select a replacement victim when the cache becomes full and space has to be freed to store another data item. For example, in one embodiment a time-to-live (TTL) based approach may be used, in which a maximum duration for which a given data item is to remain cached (called the TTL of the item) is selected, and the item is evicted when that duration expires. If all the cache entries have unexpired TTLs and space has to be freed for a new entry, the entry with the shortest remaining TTL may be selected as the replacement victim and evicted. In other embodiments, an LRU (least-recently-used) approach may be used, in which the cache entry which has not been accessed for the longest duration among the currently cached entries may be selected as an eviction victim. In one embodiment, eviction victims may be selected based at least in part on other criteria—e.g., based on the size of the entry in scenarios in which different cache entries have different sizes, based on characteristics of the client-side component on whose behalf the data item is cached, based on locality with respect to other data items that are currently cached, and so on. Some client-side components may be assigned higher priority than others, for example, and a data item cached on behalf of a high priority client may be retained in the cache while a data item cached on behalf of a low priority client may be evicted. In one example of locality-based eviction criteria, a data item DI1 may be retained in the cache in preference to a different data item DI2 if DI1 is part of a larger collection of objects (such as if DI1 is a record of a table T1) which is currently being accessed or expected to be accessed in the near future. Combinations of such criteria may be used in various embodiments, and different query accelerator nodes may utilize different criteria in at least some embodiments.

According to at least one embodiment, a given query accelerator node of a fleet may evict a data item from its local cache independently of other nodes—e.g., without synchronizing the eviction with other nodes and/or without notifying any other node. Consider a scenario in which a query accelerator fleet comprises nodes N1, N2 and N3. If node N2 decides, based on eviction criterion EC1, that a data item DI1 is to be evicted from its local cache, and N2 is required to notify other nodes regarding the eviction, this may require a minimum of two messages (one to N1 and one to N2). If all the nodes have to synchronize their evictions (that is, if N1 and N3 also have to evict their copies of DI1 and verify that they have done so), this may require even more messages (e.g., acknowledgements may have to be sent indicating that the local evictions have been performed at each node), depending on the implementation. In contrast, if each node is allowed to evict data items without notifying other nodes and without strict synchronization, this may reduce network traffic associated with evictions, which may reduce overall network bandwidth consumption. In the above example, if N2 is allowed to evict DI1 independently of the other nodes, and N3 happens to retain a replica of DI1, N3 may be able to fulfill a read query from its local cache even after DI1 has been evicted from N2's cache. Of course, at some point in time, N3 and/or N1 may also evict their copies of DI1, e.g., on the basis of different eviction criteria as used at N2 (or on the basis of the same eviction criterion). Such independent and asynchronous evictions may be especially well suited to environments in which different query accelerator nodes have caches (and/or query processors) with different capabilities or sizes, and/or in scenarios in which the workloads of the nodes differ from one another. In order to be compatible with un-synchronized local caches, the applications on whose behalf the query accelerators are set up may be designed with the appropriate consistency models in various embodiments—that is, an application may not require that the state of all the local caches is identical at any given point in time with respect to any given data item. In some embodiments, at least a subset of the nodes of a fleet may be configured to synchronize their cache evictions with one another, or to notify one or more other nodes when they evict a data item from their local caches. In some embodiments, master nodes may apply different eviction policies (with respect to synchronization and/or notification) than non-master nodes.

In addition to the types of read/write distribution policies (which control whether some nodes are only permitted to handle reads, or whether all nodes can handle writes) and eviction policies (which govern how, and how independently of each other, cached data items are evicted or removed), a number of different policies or rules regarding read miss handling (which govern the operations performed when a read request which cannot be satisfied from a local cache) may be enforced in various embodiments. In one embodiment, for example, in which a fleet comprises master and non-master nodes, a read miss for a data item DI1 at a non-master node NM1 may result in a request for DI1 being sent to the master node from NM1. According to other read miss handling policies, a request for the missing data item may be sent directly to the back-end data store instead of to a master node, or a request may be sent to one or more non-master nodes instead of to a master node. Furthermore, in some embodiments a read miss response may be accompanied by the propagation of the data item to other nodes— e.g., the master node may also send a replica of the data item to non-master nodes which did not request the data item, under the assumption that reads for that data item are likely to occur again relatively soon. In embodiments in which the query accelerator nodes operate relatively independently of one another, it may sometimes be the case that a cache miss for the same data item may be handled using distinct miss handling rules at two different nodes—for example node N1 may obtain the missing data item from the back-end data store, while node N2 may obtain the missing data item from another node of the fleet.

In at least one embodiment, the client-side components may comprise intelligent routing modules which enable particular query accelerator nodes to be targeted in preference to others, at least for certain types of I/O requests. For example, metadata indicative of the differences among the query accelerator nodes (e.g., non-uniform cache sizes, different cache storage device types, etc.) may be available to the intelligent routing modules. Based for example on an examination of the predicates of a given read query which is to be transmitted to the query accelerator layer, and on the available metadata, an intelligent router may determine that the probability of being able to obtain a response from the cache at a particular node N1 is greater than the probability of being able to obtain a response from the cache at a different node N2. Consequently, the intelligent routing module may direct the query to N1 rather than to N2 in such a scenario. In some embodiments, different subcomponents of the application may direct their I/O requests to respective subsets of the query accelerator fleet—e.g., if an application accesses two database tables T1 and T2, query accelerator nodes N1 and N2 may be used primarily for requests directed to T1, while query accelerator nodes N3 and N4 may be used primarily for requests directed to T2. In at least some scenarios, using intelligent routing based on such partitioning of data sets and/or based on the differences in local cache metadata may enable better overall performance than if uniform or random routing were used. It is noted that the terms "read query" and "read request" may be used synonymously herein; in general a read query or request may include one or more predicates which can be used to determine the particular data items to be included in the response.

At least some of the query accelerator nodes may comprise intelligent query processing engines capable of recognizing and responding to certain types of queries, e.g., by processing a collection of cache entries which were stored in the cache to prepare responses to different queries earlier. For example, consider a scenario in which a read query Q1 with query predicates P1 and P2 is received at time T1 at a particular query accelerator node N1. To prepare the response R1 to Q1, a set of data items DIS1 with data items DI1, DI2, DI3, DI10 may be retrieved, e.g., from a back-end data store, and place in N1's local cache. Later, a different query Q2 with a predicate P3 (which differs from P1 and P2) may be received at N1. By examining the query predicate P3, the query processing engine of N1 may be able to determine that a response R2 to Q2 may be prepared using a subset of DIS1 (e.g., using DI1 and DI10). As a result, even though query Q2 appears to be different from query Q1, a response to Q2 may be prepared and provided to the requesting client-side component entirely from the local cache, without retrieving any items from the back-end storage service (or from any other node of the fleet). The query Q2 may be termed a "contained" query with respect to Q1 in some environments because the result for Q2 may be contained within the data items used to respond to Q1. Depending on the kinds of queries which make up the workload of a query acceleration fleet, query processing engines which are intelligent enough to recognize and respond to contained queries using previously-cached data may help improve overall query performance substantially in at least some embodiments.

In some embodiments, a given query accelerator fleet may be configured for a group of back-end data stores rather than a single back-end data store, or for a heterogeneous or federated data store at which several different data models are implemented. For example, an application may access data from one instance of a non-relational database and from one instance of a relational database, and a single fleet of query accelerator nodes may be set up for the application. The query accelerator nodes of the fleet may be able to direct requests to respective back-end entities using different query languages—e.g., a version of SQL (Structured Query Language) may be used to access the relational database, while a different query language may be used to access the non-relational database. A single query from a client-side component may sometimes be translated into several distinct back-end queries from an accelerator node in such embodiments. In one embodiment, a query accelerator fleet may be established for data stored at customer-owned premises (or other premises outside the provider network at which the query acceleration service is implemented).

Example System Environment

FIG. 1 illustrates an example system environment in which respective single-tenant fleets of query accelerator nodes may be established on behalf of respective clients of a multi-tenant data store, according to at least some embodiments. As shown, system 100 comprises respective sets of resources of three services implemented at a provider network 102—a multi-tenant data storage service 140, a query acceleration service 120 and a virtualized computing service 110. The virtualized computing service comprises a plurality of guest virtual machines (GVMs) 191 set up on behalf of various customers, such as customers C1, C2 and Ck. A given customer may store a respective data set of an application at some number of storage nodes (SNs) 145 of the storage service, while client-side components of the applications may issue I/O requests directed to the data sets from guest virtual machines 191 of the virtual computing service 110 in the depicted embodiment. Thus, client node set 152A of customer C1's application includes client-side components (CSCs) 193A, 193B and 193C running at GVM's 191A, 191B and 191C respectively. Client node set 152B of customer C2 includes CSCs 193K and 193L at GVMs 191K and 191L respectively, while client node set 152K of customer Ck includes CSC 191Q at GVM 193Q. Two example storage nodes 145 are shown—storage node 145A containing a portion of customer C1's data 146A and a portion of customer C2's data 146B, and storage node 145B comprising another portion of C2's data 146J and a portion of CK's data 146K.

Customers such as C1, C2 and Ck of the storage service 140 may in general access their data sets either directly from the service 140, or with the help of a single-tenant intermediary query accelerator fleet (QAF) 122. For example, as indicated by arrow 175, customer Ck's client-side components may access data directly from storage service 140. In contrast, respective QAFs 122A and 122B have been established for customers C1 and C2. Each QAF 122 may comprise one or more query accelerator nodes (QANs) 180 working collaboratively, with all the QANs of a given QAF being dedicated to a single customer's client nodes. QAF 122A comprises QANs 180A and 180B set up on behalf of customer C1, while QAF 122B comprises QANs 180P and 180Q. Each QAN 180 in turn may comprise a local cache 183, a query processing engine (QPE) 181, and a membership and replication manager (MRM) 182. For example, QAN 180A comprises cache 183A, QPE 181A, and MRM 182A, QAN 182B comprises cache 183B, QPE 181B and MRM 182B, and so on. It is noted that although each QAN comprises all three components (a local cache, a QPE and an MRM) in the depicted embodiment, at least some of the QANs of a given QAF may differ in one or more characteristics—e.g., they may have different performance capabilities, use different types of storage devices for their caches, the local cache sizes may vary, the types of query processing supported may vary, and so on. It is also noted that not all the client-side components of a given application or a given customer may utilize a query accelerator fleet for their I/O requests—e.g., it may be the case that a particular CSC of customer C1 may submit a particular I/O request directly to the storage service 140, while the same component may submit other I/O requests via the query accelerator fleet 122A. Although a multi-tenant storage service 140 is shown in FIG. 1, in at least some embodiments query accelerator fleets 122 may be established for a single-tenant storage service, or for a storage service that supports both single-tenant and multi-tenant modes.

Generally speaking, the data storage service 140 may serve as the authoritative source of the data sets of the customers' applications in the depicted embodiment. Client-side components 191 may prepare read and write requests according to a query language or data manipulation language (DML) of the data storage service 140. The requests may be submitted to the storage service directly (as in the case of the CSC 193Q), or to a selected QAN 180 of the submitter's QAF 122, as in the case of at least some of the client-side components of C1 and C2 in the depicted scenario. If a given request can be fulfilled using the contents of the local cache at the QAN 180 which receives the request, a response may be generated by the QPE of the QAN and sent back to the requester (as indicated by arrows 172A and 172B). For some requests, data items may have to be retrieved from the storage system 140 and/or written to the storage system 140 (as indicated by arrow 171), depending on the policies in use at the QAN. A customer may transition from using direct-to-storage-service accesses to using a query accelerator fleet 122 dynamically in the depicted embodiment—e.g., a QAF may be established after a customer has been using the storage service for a while. Similarly, if a customer wishes to stop using the query acceleration service, the customer may disable a QAF 122 and start (or resume) accessing the storage service directly.

The QAFs set up on behalf of different customers may enforce respective sets of cache-related policies 123 (e.g., policies 123A of QAF 122A, and policies 123B of QAF 122) governing various aspects of read and write operations in the depicted embodiment. For example, a control-plane component of the query acceleration service 120 may enable customers to submit QAF establishment requests which specify the rules to be used to distribute reads and writes among QANs, the rules to be used for evicting data items from the local caches, the manner in which writes are to be handled at the QANs, and/or the manner in which misses in read caches are to be handled (i.e., the data sources from which missing data items are to be retrieved to populate the caches). In some embodiments, for example, one or more of the QANs 180 of a QAF may be designated to handle writes (as well as read queries) from the CSCs 193, while other QANs may be configured to handle only read queries. The node(s) responsible for writes as well as reads may be termed "master" nodes, while the remaining node(s) may be referred to as non-master nodes in such embodiments. When a master node obtains a data item, e.g., as a result of a write operation or in response to a read miss in the local cache, it may cache the item locally and propagate respective replicas of the item to one or more non-master nodes (or all non-master nodes) in some implementations. The non-master nodes may store the replicas in their respective caches (after potentially evicting other cache entries if there is insufficient space in their caches). Subsequently, read queries directed to that data item may be fulfilled from any of the nodes whose local caches have a replica of the data item.

A number of different criteria or rules may be used to evict data items from QAN caches in the depicted embodiment. For example, data items may be selected for eviction based on their remaining TTL (time to live), based on how recently the items have been accessed (e.g., in accordance with an LRU replacement policy), based on the size of the new item to be added to the cache relative to the size of the candidate eviction victims, based on a relative priority associated with the CSC on whose behalf the item was cached, and/or based on the whether a given data item (e.g., a database record) is part of a larger collection (e.g., a database table) expected to be accessed shortly or currently being accessed. A given QAN 180 may evict, replace or overwrite a selected data item without necessarily synchronizing that eviction with any other QAN, or even without notifying any other QAN 180 in the depicted embodiment. Thus, it may be the case that at some time T1, each QAN in the QAF has a copy of a data item DI1, while at some later time (T1+delta1), the data item has been evicted from some QANs of the QAF and remains at other QANs of the QAF. Responses to read queries directed to the data item may continue to be provided using the locally-cached replicas from those nodes at which replicas remain in the caches. Each QAN may thus evict data items asynchronously with respect to, and independently of, other QANs of the QAF in at least some embodiments.

The policies 123 may also include rules for selecting the sources from which data items are to be brought into the local caches at a QAN to respond to a cache miss (and/or the order in which different possible sources are accessed, if the first source is unable to provide the data item). For example, according to one rule, a QAN may directly request the missing data item from a storage node 145, while according to a different rule, the missing data may be requested from other non-master nodes, or only from the master node. Examples of various read miss processing rules which may be employed in different embodiments are discussed below in further detail. In some cases, a miss for the same data item may be handled using different rules at two different QANs of the same QAF—e.g., one QAN may retrieve the missing item from the master node, while another may retrieve it from a non-master node.

The potential heterogeneity of the caching policy rules, and the potential non-uniformity of the QANs 180 of a given QAF 122, may enable highly customized caching for certain kinds of applications in the depicted embodiment. For example, one set of caching policies may be enforced (using a particular subset of QANs) for a particular subset or partition of a data set, while a different set of caching policies may be enforced for a different subset of the data. In some cases, intelligent routing subcomponents of the client-side components 193 may be able to use metadata about the QAN caches to select the particular QAN to which a given query should be directed, e.g., so as to maximize the likelihood of being able to obtain a response using cached data items. Intelligent routing subcomponents may even transmit some requests directly to the storage service 140, while sending other requests to the QAF. The QAN caches may be termed "transparent" caches in the depicted embodiment, as the client-side components may be able to utilize the same APIs whether they access data items directly from the back-end storage service or from the accelerator layer. In contrast, some other caching techniques may require a separate set of cache-specific APIs to be used, and may also require users to perform cache management operations (e.g., the handling of read misses, write propagation and persistence, etc.) instead of relying on the query acceleration service 120. If the QAFs 122 are established in single tenant mode, the operations performed at the QANs may only affect a single customer's application—e.g., even if a sub-optimal caching policy is used or if the customer's request sequence results in thrashing (frequent cache misses), this would not impact any other customer. Customers may resize their QAFs—e.g., by adding new QANs or disabling currently-configured QANs—dynamically in the depicted embodiment, with little or no impact on the caching performance achieved by other customers. In one embodiment, QAFs may be set up for data sets that are stored outside the provider network—e.g., data items stored in databases at customer premises (or in third-party data centers owned by entities other than the provide network operator or the customer) may be read into QAN caches and processed in response to client-side requests, and writes submitted by client-side components may eventually be propagated to storage devices located at the external data stores.

Cache Policies

Figure 2:
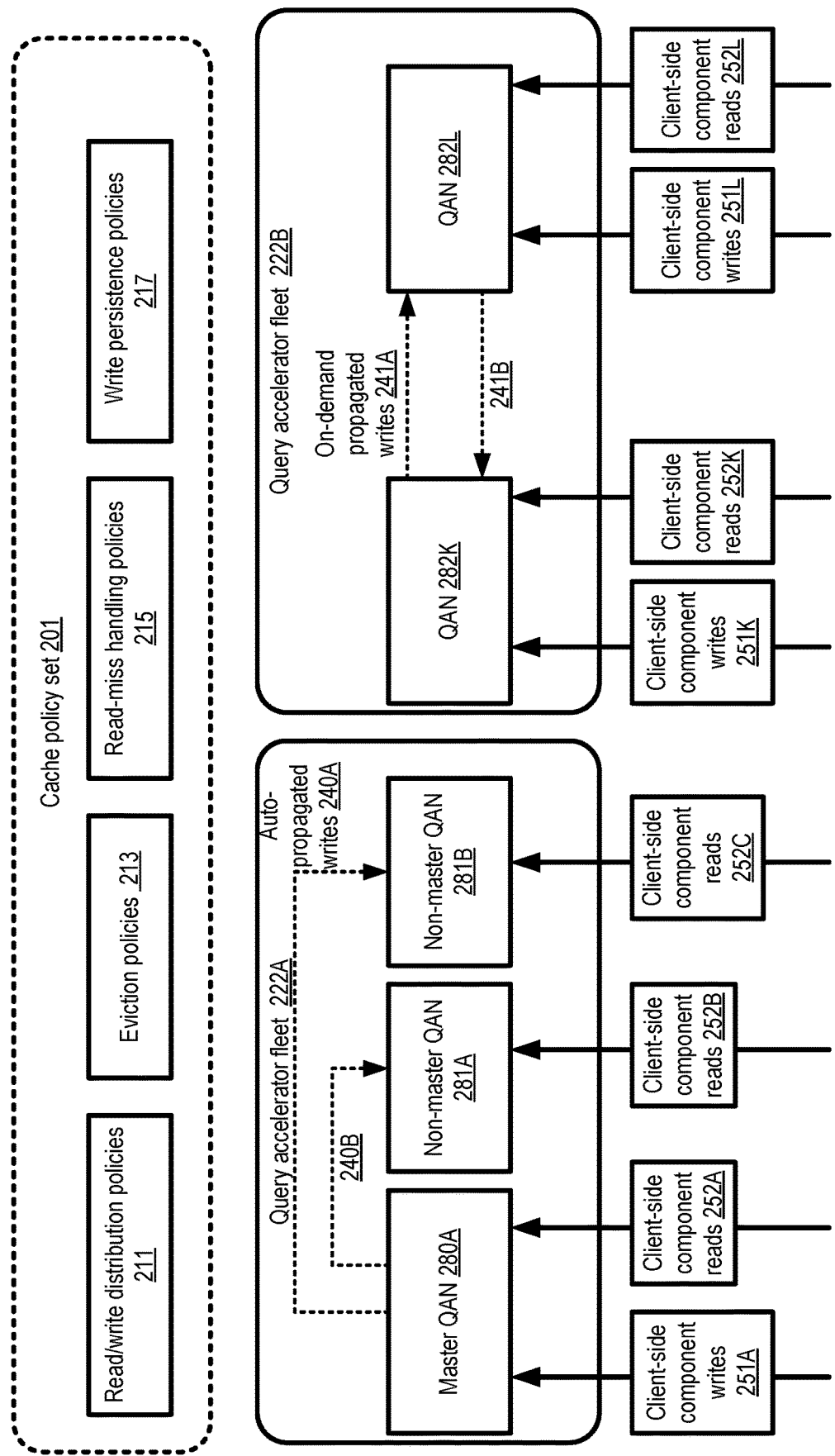
FIG. 2 illustrates examples of policies governing the handling of read and write operations at query accelerator nodes, according to at least some embodiments.

FIG. 2 illustrates examples of policies governing the handling of read and write operations at query accelerator nodes, according to at least some embodiments. Cache policy set 201 includes four types of policies in the depicted embodiment: read/write distribution policies 211, eviction policies 213, read miss handling policies 215, and write persistence policies 217.

The read-write distribution policies 211 may indicate the rules which decide which subset of the QANs of a QAF are responsible for writes, and which subset are responsible for reads. For example, in QAF 222A, one of the QANs (280A) is designated at a given point in time as a master QAN responsible for handling both reads and writes, while other QANs such as 281A and 281B are designated as non-master nodes responsible only for reads. The role of a given QAN may be changed (from master to non-master, or vice versa) dynamically in some embodiments—e.g., in the event that a master QAN becomes unreachable, one of the non-master QANs may be elected as the new master using a quorum-based election in the depicted embodiment. The membership and replication manager components of the QANs (not shown in FIG. 2) may participate in the decisions regarding role changes in some embodiments. According to the read/write distribution policy in effect at QAF 222A, the result of a client-side component's write 251A may be cached at the master QAN 280A, and propagated from the master QAN to non-master QANs 281A and 281B automatically (as indicated by the label "auto-propagated writes" 240). Any of the QANs may respond to read queries 252 (e.g., 252A, 252B or 252C). In at least some embodiments, a master or non-master role may be assigned at the granularity of data items—for example, one QAN may be assigned the master role (i.e., the responsibilities of handling/replicating writes) with respect to one set of data items at a given point in time, while another QAN may be assigned the master role with respect to another set of data items. In one embodiment, instead of implementing full replication of data items at multiple nodes, a more space-efficient replication approach such as erasure coding may be implemented for at least some data items at some of the nodes.

In QAF 222B, a different read/write distribution policy may be enforced. According to the rules of this policy, any QAN (such as QAN 280K or 280L) may accept write requests (such as requests 251K or 251L) as well as read requests (such as 252K or 252L). As such the distinction between master (write handling QANs) and non-master (QANs handling reads exclusively) nodes may not apply in QAF 222B. Furthermore, writes may not be propagated automatically to all QANs—instead, as indicated by the arrows labeled 241, writes may be propagated on-demand (e.g., a given QAN such as 280K may transmit a replica of a write in response to a request from a different QAN). Several other read and write distribution policies may be employed in various embodiments, e.g., in addition to or instead of the examples shown in FIG. 2. In some embodiments, an application's data set may be divided into partitions, with respective master QANs designated for each partition, for example.

Generally speaking, eviction policies 213 may comprise rules indicative of the degree of independence with which different QANs of a given QAF may make decisions regarding removal of data items from their local caches, the set of factors or criteria to be considered when choosing eviction victims, whether eviction-related notifications are to be transmitted from one QAN to another, and so on. Read miss handling policies 215 may comprise rules indicating the sources from which data items are to be loaded into a QAN's local cache in the event that a read request results in a cache miss, while write persistence policies 217 may indicate the manner in which writes are to be propagated from QANs to back-end data stores. As mentioned earlier, in some embodiments customers of the query acceleration service may indicate preferences regarding the specific set of caching policies to be employed in their QAFs. In other embodiments, the query acceleration service may select the policies to be enforced, e.g., based on various factors such as the number of QANs set up, the expected mix of reads and writes, the nature of the application for which the QAF is established, etc.

Non-Uniform Accelerator Nodes and Workloads

Figure 3:
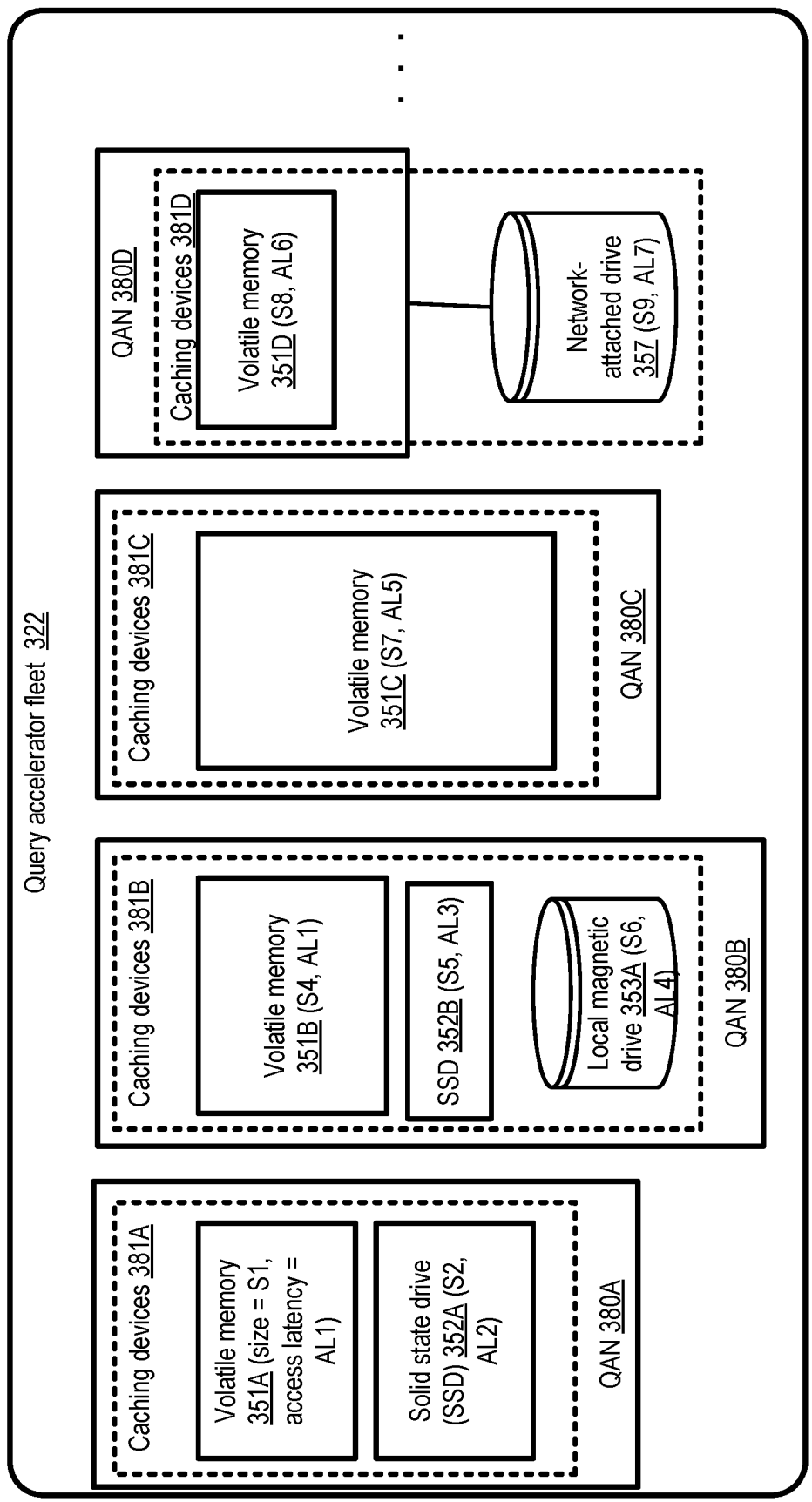
FIG. 3 illustrates examples of differences in capabilities and device types among query accelerator nodes of a given fleet, according to at least some embodiments.

As mentioned earlier, the nodes of a given query accelerator fleet may differ from one another in various aspects. FIG. 3 illustrates examples of differences in capabilities and device types among query accelerator nodes of a given fleet, according to at least some embodiments. Query accelerator fleet 322 comprises four QANs 380A-380D. The local cache of QAN 380A comprises portions of two caching devices 381A: a volatile memory device 351A and a solid state drive (SSD) 352A. The volatile memory portion of the cache of QAN 380A has a size S1 and an average access latency AL1 (e.g., a read response time for a data item of a selected size), while the SSD portion has a size S2 and an average access latency AL2.

QAN 380B's caching devices 381B comprise three types of devices: a volatile memory portion 351B with size S4 and average latency AL1 (the same average latency as that of the volatile memory at QAN 380A), an SSD portion 352B with size S5 and average latency AL3, and a local magnetic drive 353A with a size S6 and an average latency AL4. QAN 380C's caching devices 381C comprise only a volatile memory 352C with size S7 and access latency AL5. QAN 380D's caching devices 381D include a volatile memory portion 351D with size S8 and access latency AL6, and a network-attached drive 357 with a size S9 and an access latency AL7. In the non-uniform configuration illustrated in FIG. 3, the different QANs may use different combinations of a variety of storage or memory devices for their caches. In other embodiments, some subset (or all) of the QANs may have identical cache configurations.

Figure 4:
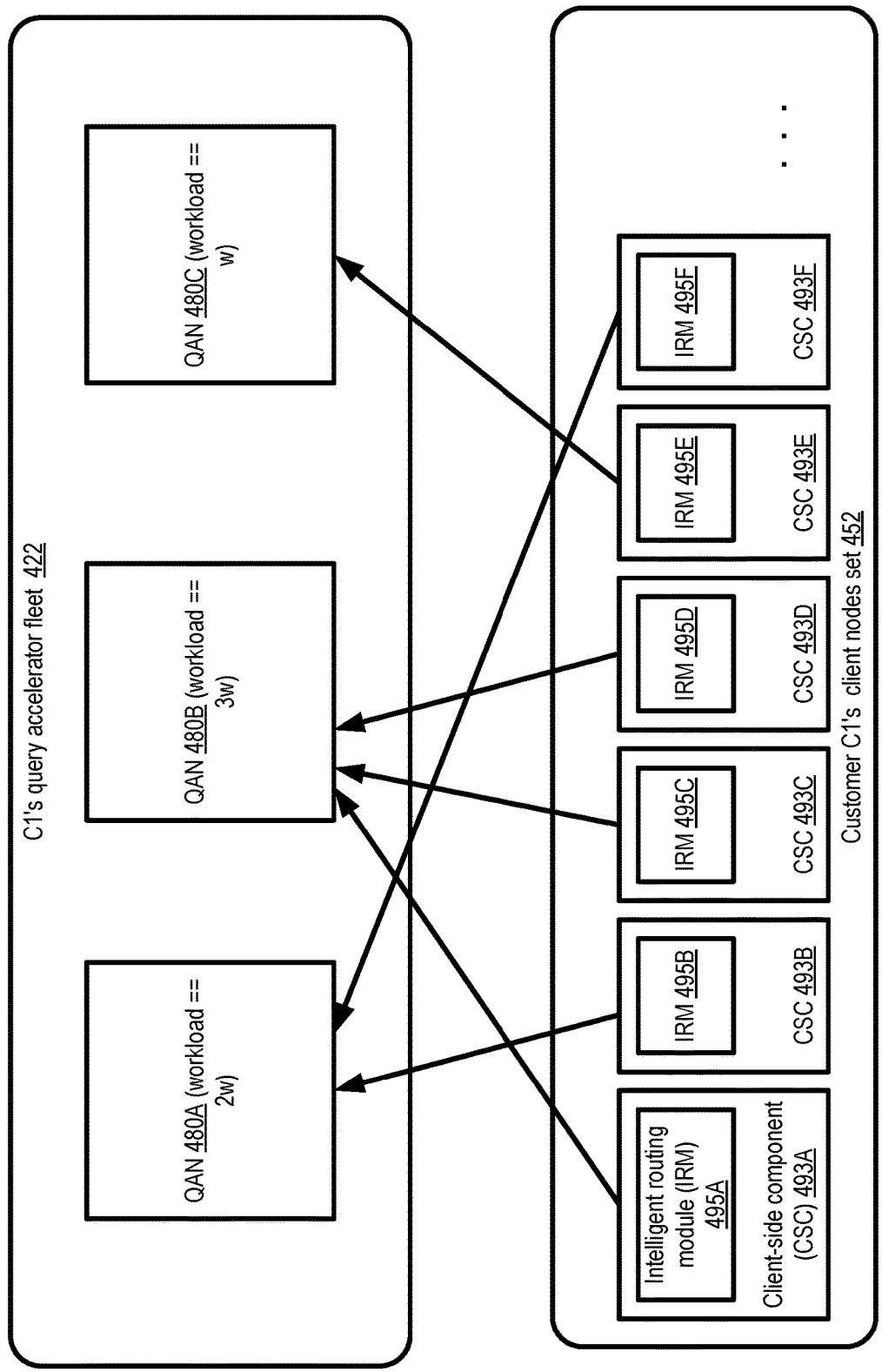
FIG. 4 illustrates an example of intelligent client-side routing of I/O (input/output) requests, resulting in a potentially non-uniform workload distribution among query accelerator nodes of a fleet, according to at least some embodiments.

The QANs of a given QAF may differ not only in their capabilities in some embodiments, as shown in FIG. 3, but also in their workloads. FIG. 4 illustrates an example of intelligent client-side routing of I/O (input/output) requests, resulting in a potentially non-uniform workload distribution among query accelerator nodes of a fleet, according to at least some embodiments. Customer C1's query accelerator fleet 422 comprises three QANs 480A-480C in the depicted embodiment. Each of the several client-side components 493 (e.g., 493A-493F) of C1's application includes a respective intelligent routing module (IRM) 495 (e.g., IRMs 495A-495F respectively at client-side components 493A-493F). The IRMs may, for example, be provided metadata regarding the differences between the QANs 480 and/or the rules or heuristics to be followed when selecting a destination for a given query. The target QAN for a given query may be selected based at least in part on the query's predicates. In some embodiments, the workload directed to any given QAN may depend on the subset or partition of the application's data set to which a query is directed. For example, an application's data set may comprise K tables, with one QAN being designated to handle a respective subset of the tables. Alternatively, in some implementations a hash function (whose input may include components of a query's predicates such as table identifiers, object identifiers or record identifiers) may be used to select the particular QAN to which a query should preferably be directed.

In some embodiments in which data items are replicated among the QANs, but different QANs have caches of different sizes or use different eviction policies, it may be possible for an IRM to calculate or estimate relative probabilities of finding a given set of data items in the local cache of different QANs. For example, with respect to a given query Q1 with predicates P1 and P2, the probability of finding the query results in QAN 480A's cache may be estimated as being twice the probability of finding the query results in QAN 480B's cache. Such probabilities may be computed for some subset or all of the QANs by an IRM 495, and a particular QAN whose probability exceeds a threshold may be selected as a target for a given query being prepared at a client-side component 493. In the depicted example scenario, the workload of QAN 480B (e.g., over a particular time interval) is 3w, three times the workload w of QAN 480C and one and a half times the workload 2w of QAN 480A. In such a heterogeneous workload scenario, the approach of evicting data items independently from the various QAN caches may be especially useful. In some embodiments, an IRM 495 may transmit requests directly to the back-end data store instead of routing it via the QANs. This approach may be taken, for example, if the probability of re-accessing a particular data item targeted in the request is estimated to be low (and hence the benefit of caching that data item at the QANs is also estimated to be low).

Un-Synchronized Eviction and Read Miss Handling

Figure 5:
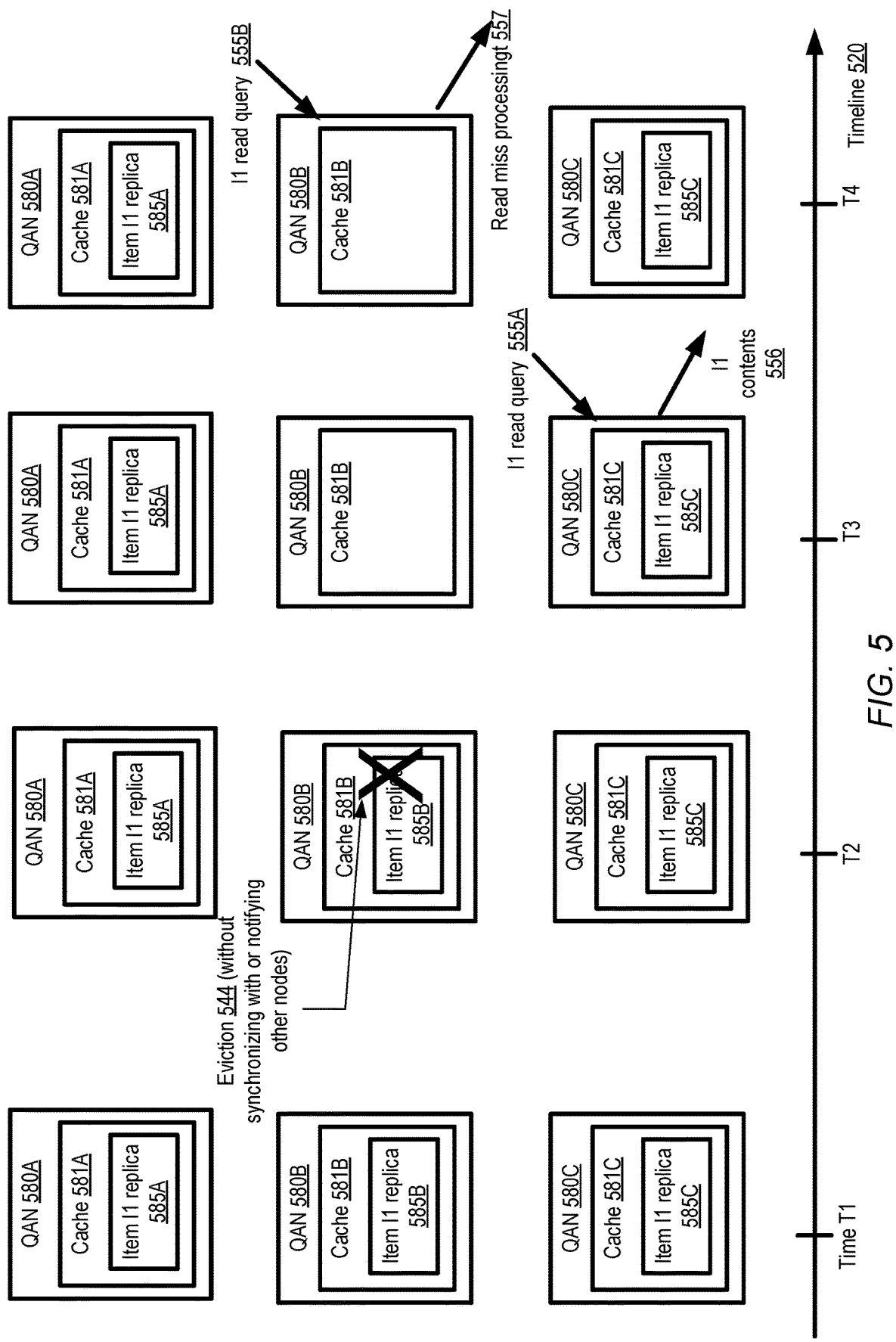
FIG. 5 illustrates an example timeline of events associated with eviction of a data item from a local cache of query accelerator node, according to at least some embodiments.

FIG. 5 illustrates an example timeline of events associated with eviction of a data item from a local cache of query accelerator node, according to at least some embodiments. A query accelerator fleet set up for a customer comprises three nodes 580A, 580B and 580C in the depicted scenario, with respective local caches 581A, 581B and 581C. At time T1 along timeline 520, each of the caches 581A-581C contains a respective replica (582A-582C) of a data item I1. The data item may have been retrieved from a back-end data store into one of the caches, for example by a QAN designated as the master, and replicated to the other QANs at the initiative of the master. In some embodiments, the replicas of the data item may have been retrieved independently (and asynchronously with respect to one another) from the back-end data store by each of the QANs.

At some time T2 after T1, replica 582B of data item I1 is evicted from cache 581B at QAN 580B. This may occur, for example, if the TTL of the replica 582B expires, or if a new item is to be included in cache 581B and cache 581B happens to be full enough to require the replacement of a cached item. Replica 582B may be removed or overwritten as part of eviction 544 without notifying any of the other QANs and without synchronizing or replicating the eviction at any of the other QANs in the depicted embodiment. The other replicas of item I1 at QANs 580A and 580C may continue to be used to respond to read requests after the eviction 544. For example, at time T3, a read query 555A whose result set includes I1 may be received at QAN 580C, and I1 contents 556 may be obtained from cache 581C to respond to the request 555A. At time T4, a read query 555B for I1 is received at QAN 580B, which results in a read miss at cache 581B. Depending on the read miss-related rules or policies in effect, QAN 580B may then re-obtain a replica from a selected data source as part of its read miss processing 557 in the depicted embodiment.

Figure 6A:
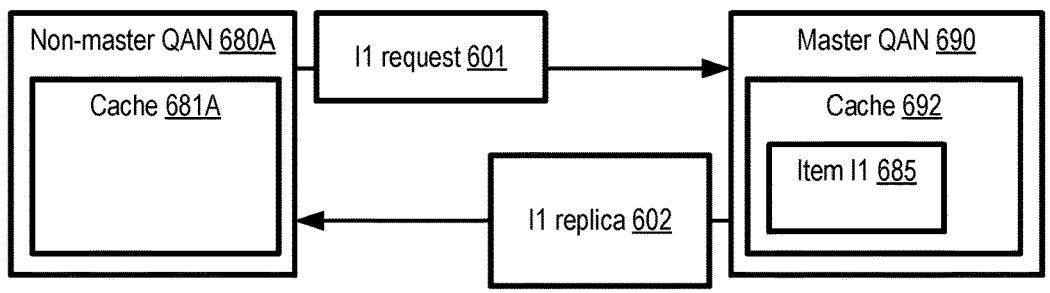
FIGS. 6a, 6b, 6c, 7a and 7b collectively illustrate examples of read cache miss handling approaches which may be employed at a query accelerator node, according to at least some embodiments.

FIGS. 6a, 6b, 6c, 7a and 7b collectively illustrate examples of read cache miss handling approaches which may be employed at a query accelerator node, according to at least some embodiments. In the scenarios depicted FIG. 6a-FIG. 7b, at a given point in time, a QAN may be designated as either a master (with responsibilities for handling writes as well as reads from client-side components) or a non-master. In FIG. 6a, a read miss with respect to data item I1 is encountered at a non-master node 680A with cache 681A. That is, a query is received at node 680A, a determination is made (e.g., by the query processing engine of QAN 680A) that data item I1 is needed to respond to the query, and a further determination is made that cache 681A does not currently contain a valid replica (e.g., a replica whose TTL has not expired) of I1. In accordance with the read miss processing rule labeled R1 ("source=master, populate-requester-only"), the master node 690 is identified as the source from which the data item should be obtained, and a corresponding request 601 is sent to the master QAN 690. The master QAN 690 provides a replica of I1 602 to QAN 680A from the master's own cache 692, without propagating additional replicas of the data item to any other QANs. It is noted that at the time that the request 601 is received at the master node in FIG. 6a, the master node's cache 692 may not necessarily contain the I1 replica 685. Based on the read miss processing rule R1 in effect, it is the responsibility of the master node 690 to obtain a replica of I1 if such a replica is not present, and use that replica to respond to the request from non-master node 680A; the replica may be obtained, for example, from the back-end data store or from a different QAN.

Figure 6B:
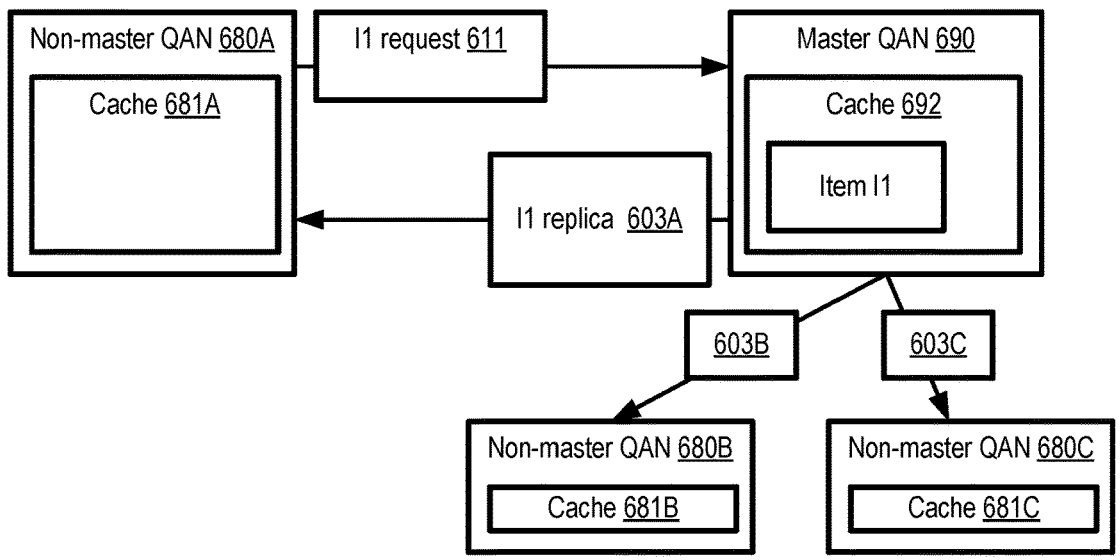
Figure 6C:
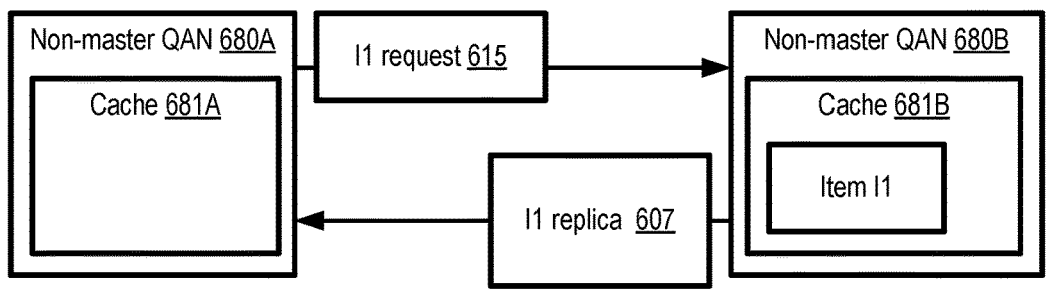

A variation on the master-oriented approach towards read miss handling of FIG. 6a is shown in FIG. 6b. Once again, a read miss occurs at a non-master node 680A, and a request 611 for the missing data item is sent to the master node 690. This time, however, in addition to providing a replica 603A to the requesting non-master node 680A, the master QAN 690 may also transmit respective replicas 603B and 603C to other non-master QANs 680B and 680C in accordance with read miss processing rule R2 ("source=master, populate-multiple-nodes"). Such multi-node propagation may be used, for example, under the assumption that if item I1 is required for a read query received at QAN 680A, it is likely that other read queries directed to other QANs may also require I1 in the near future. Of course, it may be the case that another QAN such as 680B or 680C may already have a copy of I1 in its cache (e.g., 681B or 681C) in which case the transmission of the replica (603B or 603C) from the master may be ignored. In some embodiments in which each cached entry has an associated TTL, the transmission of a replica such as 603B to a QAN which already has a copy of I1 may result in extending the TTL of the copy. In one example scenario, the version of I1 which is sent from the master may be more recent (i.e., may contain more recent updates to I1) than the version stored currently in a QAN's cache, in which case the older version may be overwritten by the newer version.

In some embodiments, a read miss at a non-master node may not necessarily require interactions with the master QAN. According to rule R3 ("source=peer, populate-requester-only") of FIG. 6c, for example, a request 615 for the missing data item may be sent to any other QAN, such as a different non-master node 680B or the master QAN. If the recipient of the request 680B has the data item in its cache 681B, a replica may be provided to the requester, e.g., without propagating replicas to any other node.

Figure 7A:
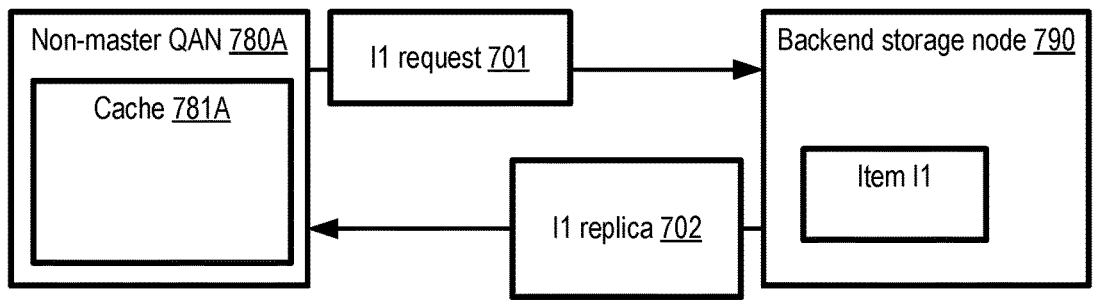

FIG. 7a illustrates a second approach which does not involve interactions with the master QAN. Upon encountering a read miss, non-master node 780A sends a request 701 for the missing data item I1 directly to a selected backend storage node 790. The storage node, which contains the authoritative version of I1, sends a replica 702 of I1 to populate the requester's cache. Other QANs are not affected in accordance with the read miss processing rule R4 ("source=backend, populate-requester-only").

Figure 7B:
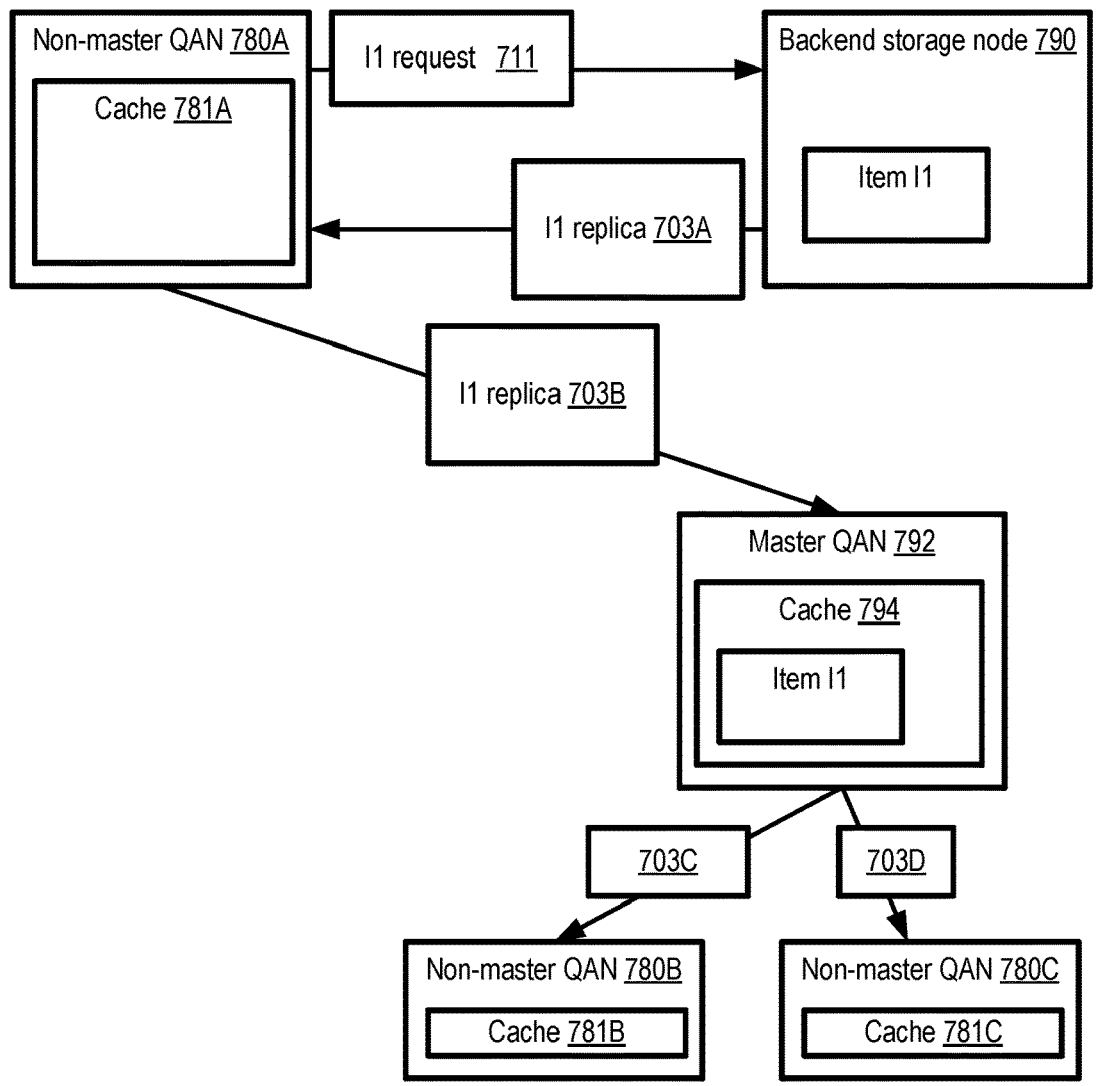

In some embodiments, when a data item is retrieved from the backend storage system, it may be propagated to all the QANs, and the propagation may be led by the master QAN. FIG. 7b depicts this scenario, in which read miss processing rule R5 ("source=backend, multi-node propagation via master") is in effect. Non-master node 780A sends a request 711 for item I1 to a backend storage node 790. The backend node sends a replica 703A to the requesting QAN 780A. QAN 780A then sends a replica 703B of I1 to master QAN 792. The master QAN then propagates respective replicas 703C and 703D on to other non-master QANs 780B and 780C. As mentioned earlier, a master or non-master role may be assigned at the granularity of data items in some embodiments. For example, at a given point in time, one QAN may be assigned the master role with respect to one set of data items DIS1 at a given point in time, and may therefore be responsible for handling read misses with respect to DIS1 items (as in FIG. 6a or 6b) and propagating data items of DIS1 (as in FIG. 7b). Concurrently, a different QAN may be designated as the master for a different set of data items DIS2. It is noted that in various embodiments, read miss processing rules other than the rules R1-R5 shown by way of example in FIG. 6a-FIG. 7b may be employed. In at least some embodiments, different QANs may employ different read miss processing rules—that is, the manner in which read misses (even for the same data item) are handled may differ from one QAN of a fleet to another.

Heterogeneous Back-Ends

Figure 8:
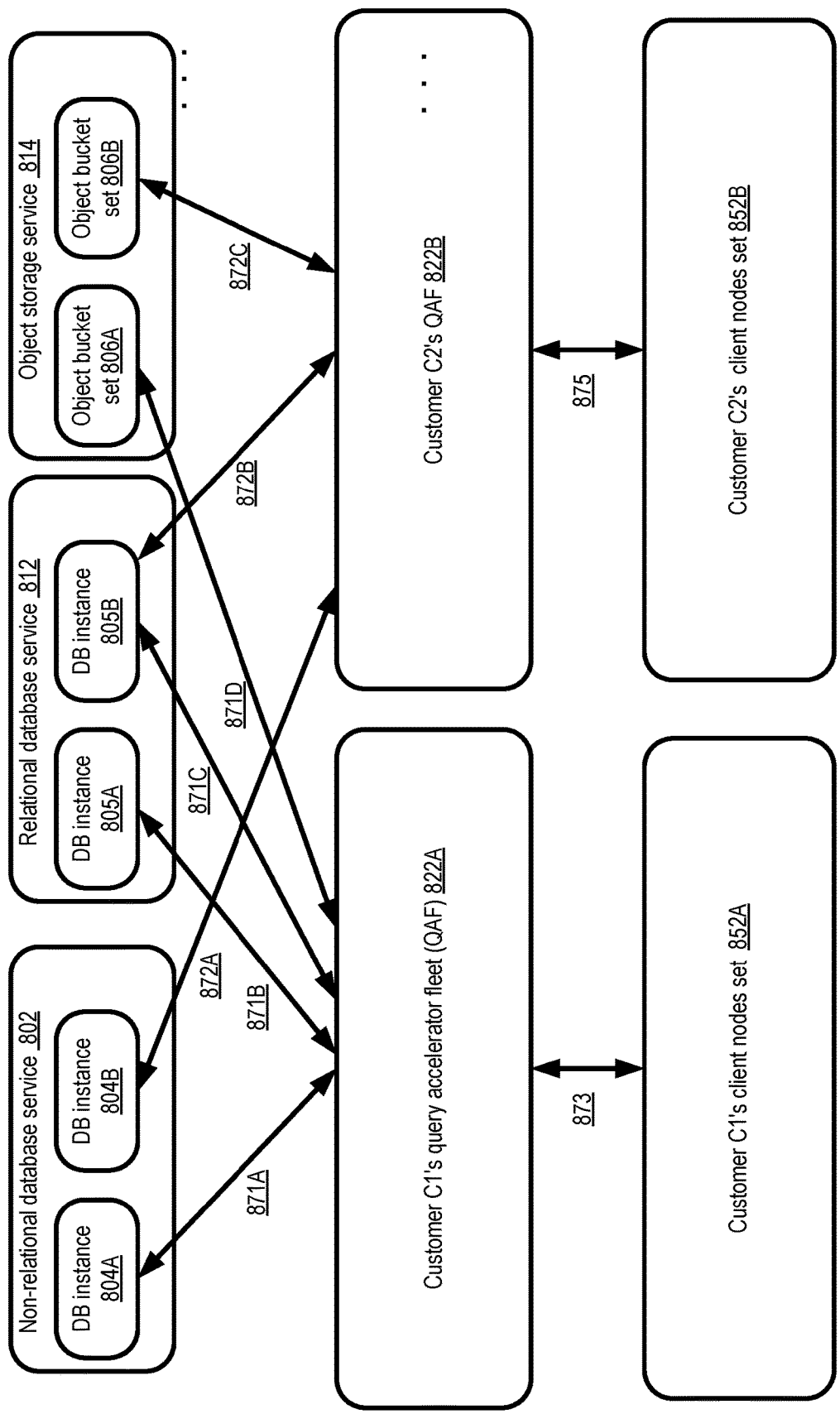
FIG. 8 illustrates examples of the use of query accelerator fleets for heterogeneous collections of back-end data stores, according to at least some embodiments.

FIG. 8 illustrates examples of the use of query accelerator fleets for heterogeneous collections of back-end data stores, according to at least some embodiments. In the depicted embodiment, the applications of customer's C1 and C2 access data stored in three different storage services of a provider network: a non-relational database service 802, a relational database service 812, and an object storage service 814. Within each of the database services 802 and 812, multiple database instances may be set up on behalf of various customers: for example, relational database instances 804A and 804B may be established using the resources of service 802, while non-relational database instances 805A and 805B may be set up using the resources of service 812. Similarly, object bucket sets 806A and 806B may be established using the resources of object storage service 814. A given object bucket may comprise an unstructured data item of an arbitrary size, with web services interfaces used to access the object. Each storage service 802, 812 and 814 may implement its own sets of programmatic interfaces—e.g., an SQL-based language may be used to access data at the relational database instances, a key-value based query language may be used at the non-relational database instances, and an HTTP URL (HyperText Transfer Protocol Universal Record Locator) based interface may be used to access the object buckets of service 814.

Query accelerator fleet 822A may be established in behalf of customer C1 in the depicted scenario, acting as an intermediary between C1's client node set 852A and the storage services. Similarly, query accelerator fleet 822B may be established on behalf of customer C2, acting as an intermediary between C2'c client node set 852B and the storage services. Client-side components of the customers' applications may submit I/O requests or queries to QANs within their respective QAFs 822, and receive corresponding responses, as indicated by arrows 873 and 875. A given read query from a client-side component may potentially be translated at a QAN into more than one request to a respective database instance or object bucket set in the depicted embodiment. For example, one request from client node set 852B may result in a first request 871A to non-relational database instance 804A, a second request 871B to relational database instance 805A, a third request 871C to a second relational database instance 805B, and a fourth request to object bucket set 806A. Similarly, a particular request from client node set 852B may result in a first request 872A to non-relational database instance 804B, a second request 872B to relational database instance 805B, and a third request 872C to object bucket set 806B. The requests to the back-end data stores may be formatted in the appropriate query language at the QANs, e.g., by the query processing engine; that is, a QAN may be able to retrieve (and write) data items using several different languages and data models. Results from several back-end data stores may be stored in a common cache at a QAN in some embodiments. In at least one embodiment, separate caches or separate cache partitions may be used for the different back-end data stores. In general, a given QAN may communicate with any number of back-end data store instances, implementing any combination of data models (e.g., a relational data model, a non-relational data model, or an object data model) on behalf of customers in the depicted embodiment. In some embodiments, a read query submitted by a client-side component may be formatted in an accelerator-layer query language, and the query may be transformed into the appropriate back-end layer query language(s) or API(s) at the QAN. In at least one embodiment, client-side components may also be permitted to create and manipulate data items that reside only at the query acceleration service—that is, a given data item may not necessarily be written to a back-end data store.

In some embodiments, the back-end data stores associated with a QAF 822 may include one or more file systems (including, for example, distributed file systems similar to the Hadoop Distributed File System and/or single-node file systems). As mentioned earlier, in various embodiments a QAF may be set up as an intermediary between an external data store (located outside the provider network, e.g., at a customer's data center, customer office premises, or third-party premises) and client-side components issuing read and write requests. In one such embodiment, the back-end may include one or more data stores within the provider network and one or more data stores outside the provider network.

Fleet Configuration-Related Interactions

Figure 9:
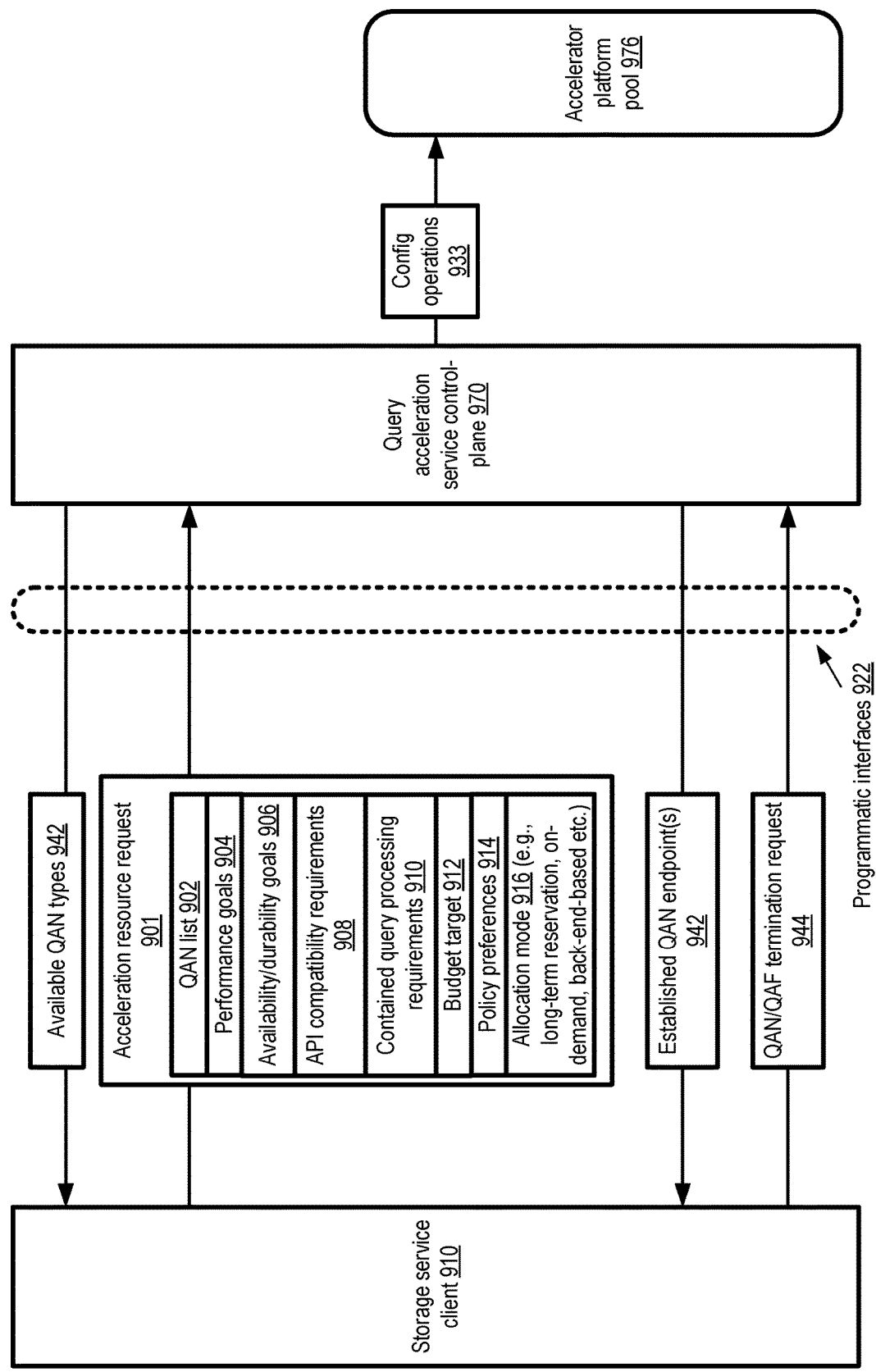
FIG. 9 illustrates example interactions between a data store client and the control-plane of a query acceleration service, according to at least some embodiments.

FIG. 9 illustrates example interactions between a data store client and the control-plane of a query acceleration service, according to at least some embodiments. A control-plane component 970 of the query acceleration service may implement a set of programmatic interfaces 922 enabling storage service clients 910 to submit QAF requests and receive QAF-related information in the depicted embodiment. In some embodiments, a number of different QAN types, which may for example differ from one another in performance capabilities, cache size and/or query processing capabilities, may be supported at the query acceleration service. In one scenario, "large", "medium" and "small" QANs may be supported, for example. An indication 942 of available QAN types may be provided via programmatic interfaces 922 to a client 910 in the depicted embodiment.

The client 910 may indicate requirements or preferences for a QAF using a variety of different parameters of an acceleration resource request 901. In some cases, for example, a client may simply provide a list of desired QANs 902, such as the logical equivalent of "Please establish four medium QANs for my back-end data store DS1". In at least one embodiment, a client may instead or in addition provide a set of performance goals 904, such as a targeted latency and/or throughput for various types of I/O operations, and the control-plane component 970 may use the performance goals to determine how many QANs of each supported type should be established. A client may indicate availability and/or data durability goals 906 for the accelerator layer in some embodiments, which may be used at the control plane 970 to select the appropriate types and numbers of QANs (and/or associated policies) to attempt to meet the goals. For example, if the client wants the data cached at the accelerator to be stored at persistent storage devices to achieve a desired level of availability or durability, QANs with attached SSDs or rotating disks may be allocated.

In some embodiments, as discussed in the content of FIG. 8, a number of back-end data stores with distinct APIs or query languages may be used for the customer's data sets, and the customer may indicate the API compatibility requirements 908 for their QANs (e.g., the set of languages or interfaces which the QAN is to use on behalf of the client I/O requests) in acceleration resource request 901. In various embodiments, the query processing engines of some QANs may be able to recognize contained queries (e.g., queries whose results can be determined using data that has been cached earlier for other queries with different query parameters). If a client prefers to utilize QANs with such capabilities, corresponding contained query processing requirements 910 may be included in request 901 in the depicted embodiment.

Different pricing rules or policies may apply to different types of query accelerator nodes in some embodiments, while in other embodiments the pricing for a QAF may be based on the performance achieved or targeted rather than on QAN types. A budget target 912 for the QAF may be indicated by the client in the request 901. Some clients may include caching policy preferences 914 in their request for acceleration resources—e.g., desired rules governing read/write distribution, eviction, read miss processing and the like may be indicated. In one embodiment, QANs may be allocated in several different modes to customers—e.g., some QANs may be reserved for log time periods, others may be obtained and released on demand, others may be allocated as long as the back-end data store resources are allocated, etc., with different pricing associated with the different modes. The allocation mode(s) 916 that the client wishes to use for their QAF nodes may be indicated in the resource request 901 in the depicted embodiment. In various embodiments, at least a subset of the types of request parameters shown in FIG. 9 may be omitted (or other parameters may be included)—for example, the client may simply provide a list of desired QANs and leave other decisions to the service.

Upon receiving acceleration resource request 901, the control plane component 970 may identify a set of QAN platforms for the client from accelerator platform pool 976 in the depicted embodiment. In some cases different parameters specified by the client may tend to contradict one another—for example a budget target may not be compatible with a performance goal or an availability goal. In such cases the control-plane component may prioritize the competing requirements, come up with a best-effort configuration which meets at least some of the requirements/preferences, and notify the client regarding the proposed solution. If the client approves the proposed configuration (or if the requirements do not contradict one another), the appropriate platforms may be selected for the client's QANs. Configuration operations 933 may be performed to establish the QANs, and a set of endpoints 942 (e.g., Internet Protocol addresses, URLs, aliases, etc.) corresponding to the established QANs may be provided to the client. At some later point in time, the client may programmatically terminate or shut down individual QANs or the entire QAF, e.g., using termination requests 944 in the depicted embodiment.

Contained Query Processing

Figure 10A:
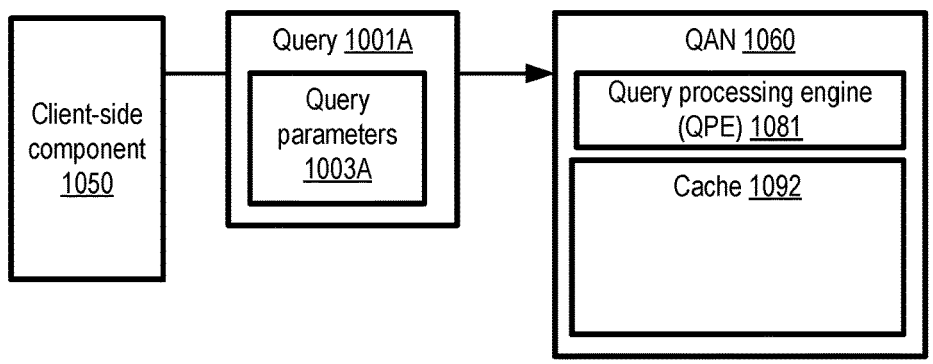
FIG. 10a-10c collectively illustrate an example of the processing of a contained query at a query accelerator node, according to at least some embodiments.
Figure 10B:
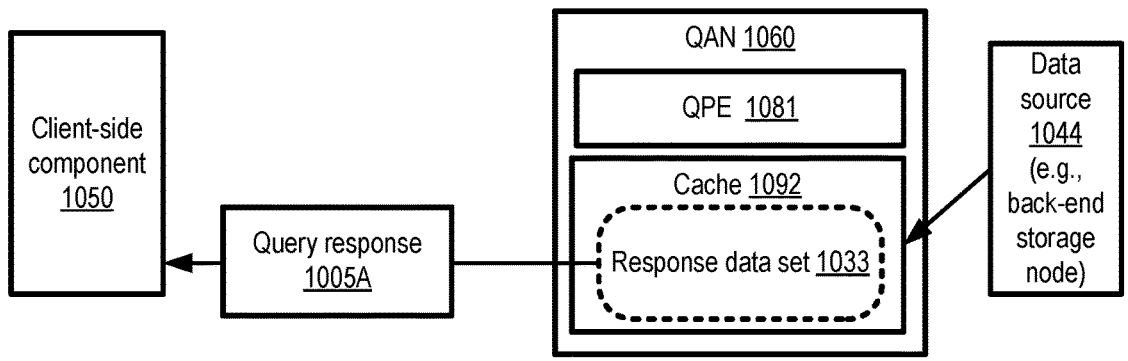
Figure 10C:
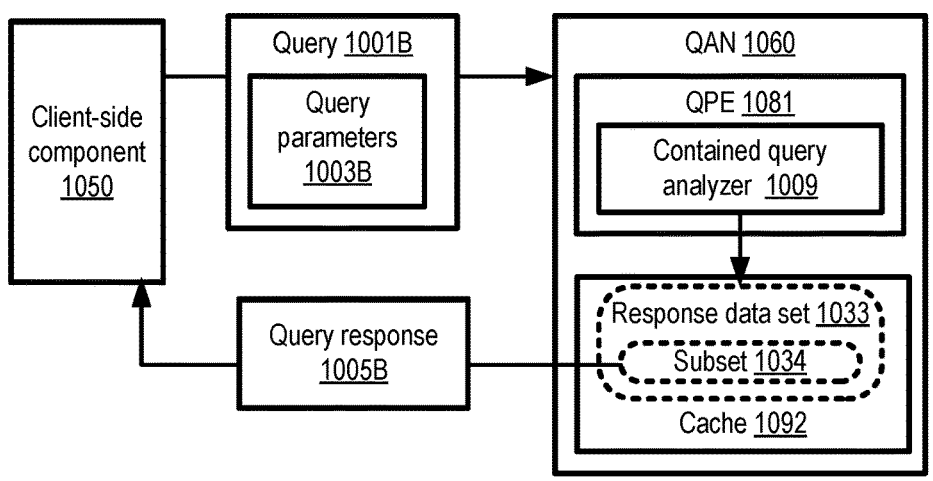

FIG. 10a-10c collectively illustrate an example of the processing of a contained query at a query accelerator node, according to at least some embodiments. As shown in FIG. 10a, a client-side component 1050 of an application submits a read query 1001A with a first set of query parameters 1003A (e.g. one or more query predicates such as the logical equivalents of SQL "where" clauses) to a QAN 1060 of a query accelerator fleet. The query processing engine (QPE) 1081 of the QAN examines the query parameters and the contents of the local cache 1092, and determines that a number of data items have to be retrieved to respond to the query.

As shown in FIG. 10b, a response data set 1033 comprising one or more data items is retrieved from a selected source 1044 (such as a back-end storage node) and stored in the local cache at the QAN 1060. The QPE prepares a response 1005A using the retrieved data set and transmits the response to the client-side component 1050.

Later, at a point of time at which at least some of the data items of the data set 1033 remain in the cache 1092, a different query 1001B is received at the QAN 1060. Query 1001B has different query parameters 1003B than query 1001A, e.g., including one or more query predicates which do not match the predicates of query 1001A. As such, a naïve comparison of the two queries would suggest that the queries differ from one another, and may therefore require different data sets to be brought into the cache 1092. In the depicted embodiment, however, query processing engine 1081 examines the query parameters 1003B and determines that the response to query 1001B can be prepared using a subset 1034 of the data set 1033 which was retrieved for query 1001A. That is, QPE 1081 is able to recognize that the data required for responding to one query (e.g., 1001B) may be contained within the data previously retrieved and cached on behalf of a different query (e.g., 1001A), despite differences in the query parameters or predicates. As a result, QPE 1081 is able to prepare and transmit response 1005B to the client-side component in the depicted embodiment. In some cases, the results of a given query may be contained within pre-cached result sets obtained for more than one earlier query—e.g., the response data set for query Q3 may comprise some data items cached for earlier query Q2 and some data items cached for earlier query Q1. In some embodiments, the ability to recognize and respond to contained queries may yield substantial performance improvements, e.g., if the delays involved in retrieving data items from the back-end data store are substantially higher than the time required to prepare a query response from the local cache at the QAN.

Methods for Independent Evictions at Accelerator Fleet Nodes

Figure 11:
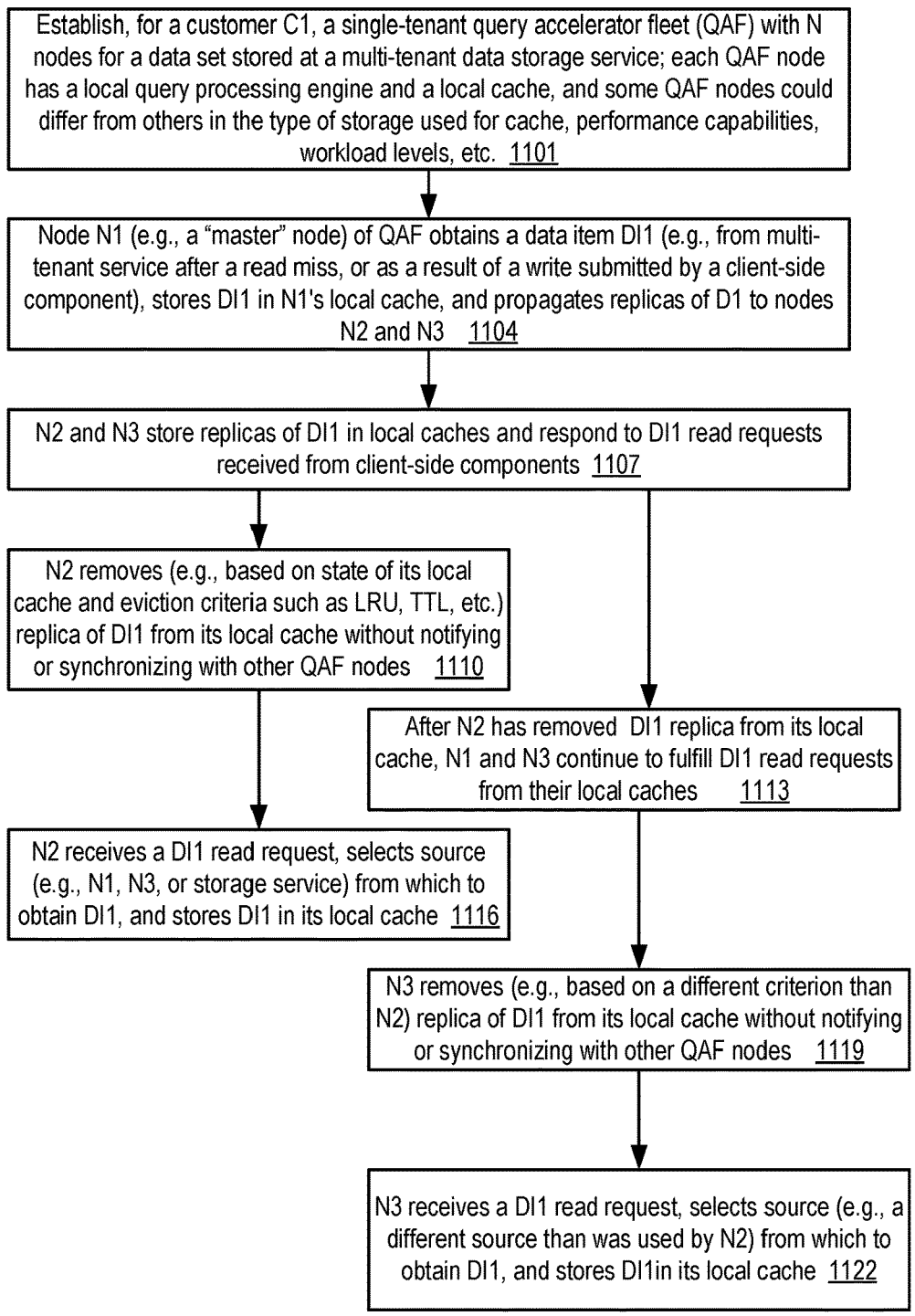
FIG. 11 is a flow diagram illustrating aspects of operations that may be performed at a query acceleration service on behalf of a client, according to at least some embodiments.

FIG. 11 is a flow diagram illustrating aspects of operations that may be performed at a query acceleration service on behalf of a client, according to at least some embodiments. As shown in element 1101, a single-tenant query accelerator fleet (QAF) comprises several query accelerator nodes (QANs) may be established on behalf of a customer C1 of a multi-tenant storage service. Each QAN may comprise a local cache, and the capabilities of different QANs may not be identical. For example, the sizes of the local caches and/or the types of devices (e.g., some combination of volatile memory, SSDs, rotating disks, etc.) used for the caches may differ at some nodes relative to other nodes.

As indicated in element 1104, one of the QANs (N1, which may be designated as a "master" QAN) may obtain a data item DI1 and store it in its local cache. The data item may be obtained, for example, from a storage node of the multi-tenant data store after a miss in the local cache, or may be obtained as a result of a write request from a client-side component. The master QAN may initiate a propagation of respective replicas of DI1 to other QANs such as N2 and N3 in the depicted embodiment.

N2 and N3 may store their respective replicas of DI1 in their local caches, and use the locally-cached copies to respond to read requests received from client-side components (element 1107). At some point, N2 may decide, based on local conditions at N2 and/or a particular eviction criterion, that its replica of DI1 should be removed or evicted from the cache. As mentioned earlier, a number of factors may be taken into account to select DI1 as the eviction candidate, such as DI1's TTL, how recently DI1 has been used, the size of DI1 relative to the size of a new item which is to be cached, properties of the client-side component on whose behalf DI1 was cached, locality considerations, and the like. N2 may remove DI1's replica without notifying any other node (element 1110), and without synchronizing the eviction with other nodes (that is, at least some other QANs may continue to retain DI1 replicas in respective caches despite N2's decision to evict its replica) in the depicted embodiment.

After DI1 has been evicted from N2's cache, N1 and N3 may continue to respond to read queries shoes result set requires DI1 using their locally-cached copies of DI1 (element 1113). N2 itself may receive a read request for DI1 after the eviction of DI1 (element 1116). In response to such a query, N2 may select a particular source (e.g., either a back-end storage node of the data store, N1, or N3) based on the read miss processing rules in effect at N2, retrieve a copy of DI1 from the selected source, and respond to the query.

Asynchronously with respect to the operations performed at N1 or N2, N3 may decide that its replica of DI1 should be evicted, e.g., based on different criteria or factors than N2 (element 1119). N3 may also remove its local replica without notifying other QANs or synchronizing the eviction. Later, if N3 receives a read query for DI1 (element 1122), it may select a different source than was used by N1, obtain a replica of DI1 from the source it ash selected, and respond to the read query. The different nodes of the query accelerator fleet may thus perform evictions and read miss processing operations independently (and in some cases using different criteria or rules than other QANs. Such an approach may be especially beneficial in scenarios in which the QANs differ from one another in their workloads and/or in their capabilities. The technique of avoiding synchronization of evictions may reduce the network bandwidth associated with evictions substantially, leaving more bandwidth available for populating the caches at the QANs.

It is noted that in various embodiments, at least some operations other than those illustrated in the flow diagram of FIG. 11 may be used to implement the query acceleration-related techniques described above. Some of the operations shown may not be implemented in some embodiments or may be implemented in a different order, or in parallel rather than sequentially.

Use Cases

The techniques described above, of reducing the extent of synchronization required among the nodes of a query accelerator fleet by performing cache evictions independently at various nodes may be useful in a number of scenarios. As customers of multi-tenant data storage services develop more and more sophisticated applications, the ability to set up single-tenant accelerator fleets and customize the configurations of the fleet nodes may enable a tighter alignment of resources to specific application requirements than may have been possible using the multi-tenant service alone. Depending on the needs of the application and/or the budget constraints of the customer, accelerator nodes with widely differing capabilities may be deployed within a given fleet. Because the accelerators are single tenant, it may be possible for a customer to experiment with a wider variety of eviction rules and read miss processing rules than may have been permissible if all the resources along the data pathway were potentially shared among multiple customers.

Illustrative Computer System

Figure 12:
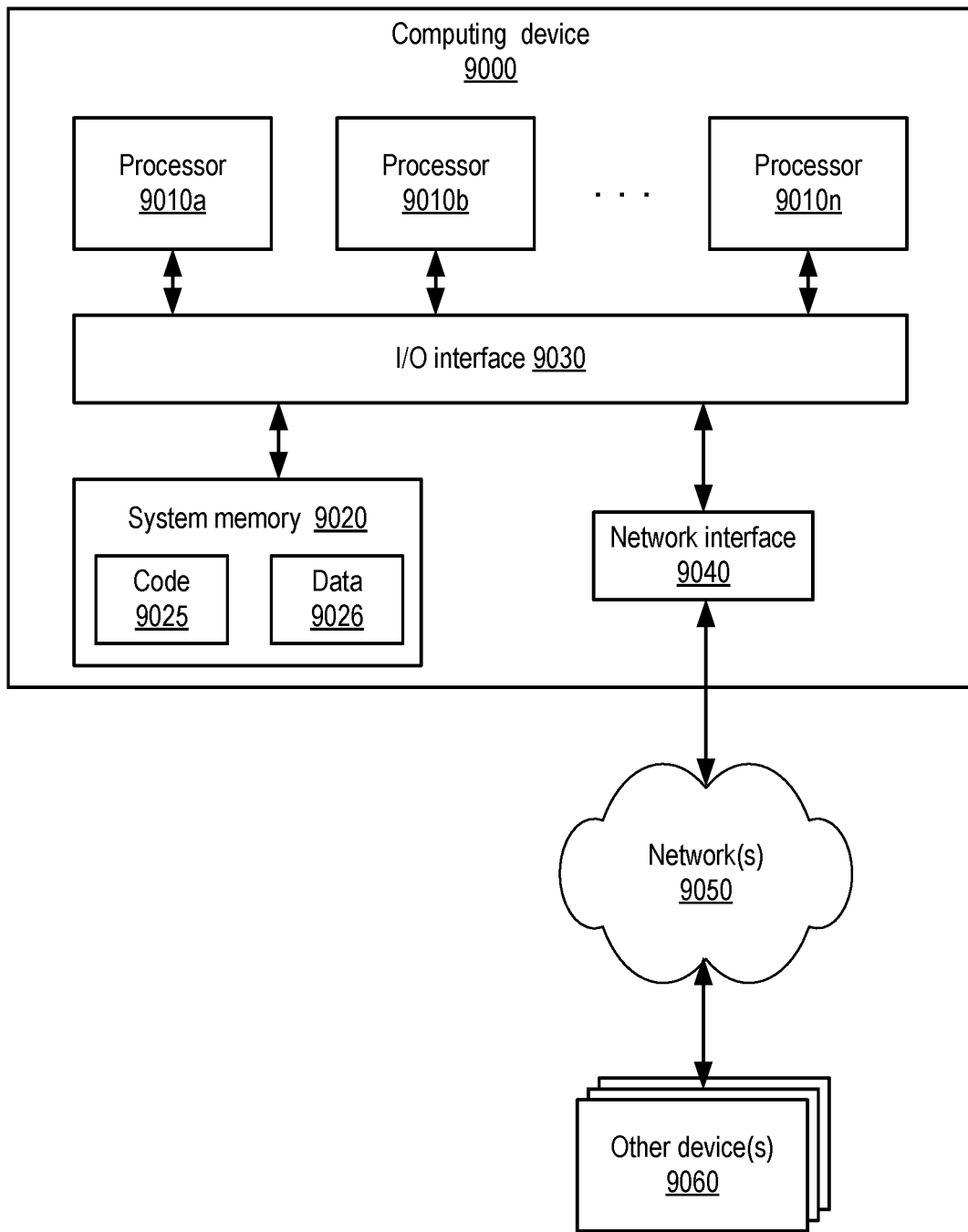
FIG. 12 is a block diagram illustrating an example computing device that may be used in at least some embodiments.

In at least some embodiments, a server that implements a portion or all of one or more of the technologies described herein, including the techniques to implement query accelerator nodes, storage service nodes, client-side components, and the like may include a general-purpose computer system that includes or is configured to access one or more computer-accessible media. FIG. 12 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices used to store physical replicas of data items. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 11, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 11 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 12 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
    obtaining, at a first query accelerator node of a plurality of query accelerator nodes associated with one or more data stores, a replica of a data item of a first data store of the one or more data stores;
    storing the replica in a cache at the first query accelerator node; and
    removing the replica from the cache without providing an indication of the removal to at least some other query accelerator nodes of the plurality of query accelerator nodes, wherein another replica of the data item is stored at least in another cache at a second query accelerator node of the other query accelerator nodes.

2. The method as recited in claim 1, wherein said removing the replica is responsive to determining, at the first query accelerator node, that the data item meets an eviction criterion, wherein the eviction criterion comprises one or more of: (a) a criterion based on a time at which the data item was accessed, (b) a time-to-live criterion, (c) a size criterion, (d) a locality criterion or (e) a criterion based on a property of a client-side component of an acceleration service.

3. The method as recited in claim 1, further comprising:
    instantiating at least one query accelerator node of the plurality of query accelerator nodes in response to a programmatic request.

4. The method as recited in claim 1, further comprising:
    determining that a probability of obtaining a response to a read request from the second query accelerator node of the plurality of query accelerator nodes is greater than the probability of obtaining the response from the first query accelerator node; and
    directing the read request to the second query accelerator node.

5. The method as recited in claim 1, wherein the other cache at the second query accelerator node differs from the cache at the first query accelerator node in one or more of: (a) a type of storage device used, (b) a performance capability or (c) a size.

6. The method as recited in claim 1, wherein the plurality of query accelerator nodes comprises a master node and one or more non-master nodes, wherein the master node is configured to respond to write requests and read requests, and wherein the first query accelerator node is a non-master node, the method further comprising:
    requesting another replica of the data item from the master node by the first query accelerator node.

7. The method as recited in claim 1, wherein the first data store comprises at least one of: (a) an instance of a relational database or (b) an instance of a non-relational database.

8. A system, comprising:
    a plurality of query accelerator nodes implemented at respective computing devices, including a first query accelerator node and a second query accelerator node, wherein the plurality of query accelerator nodes are associated with one or more data stores; and
    wherein the first query accelerator node is configured to:
        obtain a replica of a data item of a first data store of the one or more data stores;
        store the replica in a cache at the first query accelerator node; and
        remove the replica from the cache without providing an indication of the removal to at least the second query accelerator node of the plurality of query accelerator nodes, wherein another replica of the data item is stored at least in another cache at the second query accelerator node.

9. The system as recited in claim 8, wherein the replica is removed from the cache in response to determining, at the first query accelerator node, that the data item meets an eviction criterion, wherein the eviction criterion comprises one or more of: (a) a criterion based on a time at which the data item was accessed, (b) a time-to-live criterion, (c) a size criterion, (d) a locality criterion or (e) a criterion based on a property of a client-side component of an acceleration service.

10. The system as recited in claim 8, further comprising one or more control plane components of an acceleration service, wherein the one or more control plane components are configured to:
    instantiate at least one query accelerator node of the plurality of query accelerator nodes in response to a programmatic request.

11. The system as recited in claim 8, wherein the cache at the first query accelerator node does not utilize a persistent storage device.

12. The system as recited in claim 8, wherein the other cache at the second query accelerator node differs from the cache at the first query accelerator node in one or more of: (a) a type of storage device used, (b) a performance capability or (c) a size.

13. The system as recited in claim 8, wherein the plurality of query accelerator nodes comprises a master node and one or more non-master nodes, wherein the master node is configured to respond to write requests and read requests, wherein the first query accelerator node is a non-master node, wherein the master node is configured to:
    transmit, in response to receiving a request for another replica of the data item from the first query accelerator node, a respective replica of the data item to the first query accelerator node and at least one other non-master node.

14. The system as recited in claim 8, wherein the one or more data stores comprise at least one of: (a) an instance of a relational database or (b) an instance of a non-relational database.

15. One or more non-transitory computer-accessible storage media storing program instructions that when executed on or across one or more processors cause one or more computer systems to:
    obtain, at a first query accelerator node of a plurality of query accelerator nodes associated with one or more data stores, a replica of a data item of a first data store of the one or more data stores;

store the replica in a cache at the first query accelerator node; and remove the replica from the cache without providing an indication of the removal to at least some other query accelerator nodes of the plurality of query accelerator nodes, wherein another replica of the data item is stored at least in another cache at a second query accelerator node of the other query accelerator nodes.

16. The one or more non-transitory computer-accessible storage media as recited in claim 15, wherein the replica is removed from the cache in response to determining, at the first query accelerator node, that the data item meets an eviction criterion, wherein the eviction criterion comprises one or more of: (a) a criterion based on a time at which the data item was accessed, (b) a time-to-live criterion, (c) a size criterion, (d) a locality criterion or (e) a criterion based on a property of a client-side component of an acceleration service.

17. The one or more non-transitory computer-accessible storage media as recited in claim 15, wherein the cache at the first query accelerator node comprises at least a portion of a persistent storage device.

18. The one or more non-transitory computer-accessible storage media as recited in claim 15, wherein at least the first query accelerator node is configured at an acceleration service, and wherein one or more data stores comprise at least one of: (a) a file system, (b) a data store configured at least in part at a premise of a client of the acceleration service, or (c) a data store configured at least in part at a third-party premise.

19. The one or more non-transitory computer-accessible storage media as recited in claim 15, storing further program instructions that when executed on or across one or more processors cause the one or more computer systems to:

submit, from the first query accelerator node after removal of the replica from the cache, a request for another replica of the data item to the second query accelerator node of the plurality of query accelerator nodes, wherein the plurality of query accelerator nodes includes a master node configured to respond to write requests and read requests, and wherein the second query accelerator node is not the master node.

20. The one or more non-transitory computer-accessible storage media as recited in claim 15, wherein the one or more data stores include a first data store and a second data store, and wherein the one or more non-transitory computer-accessible storage media store further program instructions that when executed on or across one or more processors cause the one or more computer systems to:

submit, from the first query accelerator node to the first data store, a first request directed to a first group of one or more data items, wherein the first request is formatted in a first language of the first data store; and submit, from the first query accelerator node to the second data store, a second request directed to a second group of one or more data items, wherein the second request is formatted in a second language of the second data store, and wherein the second language differs from the first language.

* * * * *